US009560428B2

(12) United States Patent
Yan

(10) Patent No.: US 9,560,428 B2
(45) Date of Patent: Jan. 31, 2017

(54) RECONFIGURABLE OPTICAL ACCESS NETWORK ARCHITECTURES

(71) Applicant: Futurewei Technologies, Inc., Plano, TX (US)

(72) Inventor: Xuejin Yan, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/280,191

(22) Filed: May 16, 2014

(65) Prior Publication Data
US 2014/0341574 A1    Nov. 20, 2014

Related U.S. Application Data

(60) Provisional application No. 61/824,143, filed on May 16, 2013.

(51) Int. Cl.
*H04J 14/00* (2006.01)
*H04Q 11/00* (2006.01)
*H04J 14/02* (2006.01)

(52) U.S. Cl.
CPC ......... *H04Q 11/0005* (2013.01); *H04J 14/025* (2013.01); *H04J 14/0246* (2013.01);
(Continued)

(58) Field of Classification Search
CPC .... H04J 14/02; H04J 14/0282; H04J 14/0246; H04J 14/025; H04J 14/0279; H04J 14/0201; H04J 14/0227; H04J 14/0265; H04J 2014/0253; H04J 14/00; H04J 14/0216; H04J 14/08; H04J 14/0247; H04J 14/0252; H04J 14/0209; H04Q 11/0005; H04Q 11/0067; H04Q 2011/0016; H04Q 2011/0018; H04Q 2011/0022; H04B 10/506; H04B 10/572
(Continued)

(56) References Cited

U.S. PATENT DOCUMENTS 7,245,829 B1 * 7/2007 Sindile ............... H04J 14/0227
                                                          398/45
8,831,433 B2 * 9/2014 Ho ..................... H04B 10/40
                                                          398/138
(Continued)

FOREIGN PATENT DOCUMENTS

EP      2525517 A1    11/2012
WO   2011005223 A1    1/2011
WO   2011053200 A1    5/2011

OTHER PUBLICATIONS

"40-Gigabit-Capable Passive Optical Networks (NG-PON2): Transmission Convergence Layer," G.989.3, Question 2, Study Group 15, Working Party 1, "Inline Comments to Draft G.989.3 (Draft Version Dec. 31, 2013)," Dec. 31, 2013, 154 pages.
(Continued)

*Primary Examiner* — Hibret Woldekidan
(74) *Attorney, Agent, or Firm* — Conley Rose, P.C.

(57) ABSTRACT

An apparatus comprising a first tunable transmitter array comprising a first tunable transmitter and a second tunable transmitter and a cyclic array waveguide grating (AWG) wavelength router coupled to the first tunable transmitter array, wherein the cyclic AWG wavelength router comprises a plurality of input ports and a plurality of output ports, wherein the cyclic AWG wavelength router is configured to receive a first optical signal emitted from a first tunable transmitter via a first input port of the plurality of input ports, receive a second optical signal emitted from a second tunable transmitter via the first input port of the plurality of input ports, and route the first optical signal and the second
(Continued)

optical signal to the output ports dependent on one or more wavelengths used to encode the first optical signal and the second optical signal.

17 Claims, 14 Drawing Sheets

(52) U.S. Cl.
CPC ...... *H04J 14/0265* (2013.01); *H04J 14/0282* (2013.01); *H04J 14/0247* (2013.01); *H04J 14/0252* (2013.01); *H04Q 2011/0018* (2013.01); *H04Q 2011/0022* (2013.01)

(58) Field of Classification Search
USPC ............... 398/49, 61, 66–72, 79, 82, 91, 95, 90,398/165, 167.5
See application file for complete search history.

(56) References Cited

U.S. PATENT DOCUMENTS

| | | | | | |
|---|---|---|---|---|---|
| 8,995,484 | B2* | 3/2015 | Ho | ........................... | H01S 3/04 372/34 |
| 9,397,778 | B2* | 7/2016 | Lee | ....................... | H04J 14/023 |
| 9,436,021 | B2* | 9/2016 | Ye | ......................... | G02F 1/0147 |
| 2006/0140631 | A1* | 6/2006 | Brolin | ................. | H04J 14/0226 398/79 |
| 2009/0202245 | A1* | 8/2009 | Bouda | ................. | H04J 14/0226 398/76 |
| 2010/0142955 | A1* | 6/2010 | Yu | .................... | H04B 10/25754 398/72 |
| 2011/0236017 | A1* | 9/2011 | Ohlen | ................. | H04J 14/0282 398/34 |
| 2011/0293279 | A1* | 12/2011 | Lam | .................... | H04J 14/0279 398/79 |
| 2013/0089319 | A1* | 4/2013 | Grobe | ................. | H04J 14/0227 398/7 |
| 2013/0183039 | A1* | 7/2013 | Hood | .................. | H04J 14/0234 398/72 |
| 2014/0341579 | A1* | 11/2014 | Effenberger | ........ | H04J 14/0221 398/68 |

OTHER PUBLICATIONS

International Telecommunication Union, Telecommunication Standardization Sector, Study Group 15, Question 2/15, W/P 1/15, "Draft new Recommendation ITU-T G.multi," Nov. 7, 2013, 21 pages.

Kani, J., "Enabling Technologies for Future Scalable and Flexible WDM-PON and WDM/TDM-PON Systems," IEEE Journal of Selected Topics in Quantum Electronics, vol. 16, No. 5, Sep./Oct. 2010, pp. 1290-1297.

Bock, C., et al., "Hybrid WDM/TDM PON Using the AWG FSR and Featuring Centralized Light Generation and Dynamic Bandwidth Allocation," IEEE, Journal of Lightwave Technology, vol. 23, No. 12, Dec. 2005, pp. 3981-3987.

Hsueh, Y., et al., "A Highly Flexible and Efficient Passive Optical Network Employing Dynamic Wavelength Allocation," IEEE, Journal of Lightwave Technology, vol. 23, No. 1, Jan. 2005, pp. 277-286.

Nakamura, H., "λ-tunable WDM/TDM-PON Using DWBA towards Flexible Next-Generation Optical Access Networks," Progress In Electromagnetics Research Symposium Proceedings, KL, Malaysia, Mar. 27-30, 2012, pp. 507-510.

Kimura, S., "WDM/TDM-PON Technologies for Future Flexible Optical Access Networks," 15th OptoElectronics and Communications Conference (OECC2010) Technical Digest, Sapporo Convention Center, Japan, Jul. 2010, pp. 14-15.

Pal, B., et al., "Statistical Method for ROADM Cascade Penalty," IEEE, OSA/OFC/NFOEC, 2010, 3 pages.

Draft New Recommendation, ITU-T G.989.2, 40-Gigabit-Capable Passive Optical Networks 2 (NG-PON2): Physical Media Dependent (PDM) Layer Specification, Feb. 14, 2014, 94 pages.

Gagnaire, M., et al., "A new Control Plane for Next-Generation WDM-PON Access System," Second International Conference on Access Networks & Workshops, Aug. 1, 2007, 8 pages.

Shachaf, Y., et al., "A Full-duplex Access Network based on CWDM-routed PONs," Conference on Optical Fiber Communication/National Fiber Optic Engineers Conference, Feb. 24, 2008, 3 pages.

Nakamura, H., et al., "40Gbit/s-class-λ-tunable WDM/TDM-PON using Tunable B-Tx and Cyclic AWG Router for Flexible Photonic Aggregation Networks," 38th European Conference and Exhibition on Optical Communications, Sep. 16, 2012, 3 pages.

Foreign Communication From A Counterpart Application, PCT Application No. PCT/US2014/038480, International Search Report dated Sep. 24, 2014, 4 pages.

Foreign Communication From A Counterpart Application, PCT Application No. PCT/US2014/038480, Written Opinion dated Sep. 24, 2014, 7 pages.

Foreign Communication From a Counterpart Application, European Application No. 14731478.5, European Office Action dated Nov. 21, 2016, 5 pages.

* cited by examiner

RECONFIGURABLE OPTICAL ACCESS NETWORK ARCHITECTURES

CROSS-REFERENCE TO RELATED APPLICATIONS

The present application claims priority to U.S. Provisional Patent Application No. 61/824,143 filed May 16, 2013 by Xuejin Yan and entitled "Reconfigurable Optical Access Network Architectures," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over "the last mile." In a downstream direction, the PON may be a point-to-multi-point (P2MP) network comprising an optical line terminal (OLT) at a central office (CO), a plurality of optical network units (ONUs) at one or more customer premises, and an optical distribution network (ODN) connecting the OLT and the ONUs. PONs may also comprise remote nodes (RNs) located between the OLTs and the ONUs, for example, at the end of a road where multiple users reside. In recent years, time division multiplexing (TDM) PONs and wavelength division multiplexing (WDM) PONs have been deployed in order to increase bandwidth. In TDM PONs, each ONU may send and receive data across every available wavelength, but only at dedicated time intervals. In WDM PONs, each ONU may send and receive data in a continuous manner, but at dedicated wavelengths. A hybrid PON combining TDM with WDM can support higher capacity so that an increased number of users can be served by a single OLT with sufficient bandwidth per user.

The rapid growth of internet traffic continues to push broadband optical access networks to support higher data rates and better quality of services. For instance, the capacities of optical channels in some optical networks, such as PONs, are approaching about 40 gigabits per second (Gbs). Although the demand to increase bandwidth and throughput continue to grow, designs for improving optical networks are often constrained by cost, power, and size requirements. Moreover, today's PONs may not be efficiently utilizing network resources. For example, in a PON, OLT resources allocated for one ODN may not be shared with an ONU allocated for a different ODN.

SUMMARY

In one embodiment, the disclosure includes an apparatus comprising a first tunable transmitter array comprising a first tunable transmitter and a second tunable transmitter and a cyclic array waveguide grating (AWG) wavelength router coupled to the first tunable transmitter array, wherein the cyclic AWG wavelength router comprises a plurality of input ports and a plurality of output ports, wherein the cyclic AWG wavelength router is configured to receive a first optical signal emitted from a first tunable transmitter via a first input port of the plurality of input ports, receive a second optical signal emitted from a second tunable transmitter via the first input port of the plurality of input ports, and route the first optical signal and the second optical signal to the output ports dependent on one or more wavelengths used to encode the first optical signal and the second optical signal, and wherein the output ports are coupled to a plurality of ODNs.

In another embodiment, the disclosure includes a method for allocating OLT resources at an OLT comprising a first set of transmitters, the method comprising transmitting a first optical signal over a first ODN to a first set of ONUs using one of the transmitters within the first set of transmitters, transmitting a second optical signal over a second ODN to a second set of ONUs using a second transmitter within the first set of transmitters, retuning the one of the transmitters within the first set of transmitters to emit a third optical signal at a different wavelength from the first optical signal, and transmitting the third optical signal over the first ODN, the second ODN, or another ODN based upon the different wavelength.

In yet another embodiment, the disclosure includes a PON system comprising an OLT comprising a plurality of tunable transmitter arrays, a plurality of ODNs coupled to the OLT, and an AWG wavelength router coupled to the OLT and the ODNs such that the AWG wavelength router is positioned between the OLT and ODNs, wherein the AWG wavelength router is configured to receive a combined optical signal from one of the tunable transmitter arrays, wherein the combined optical signal comprises a plurality of encoded wavelengths and distribute the encoded wavelengths to the ODNs according to a plurality of wavelength bands the encoded wavelengths fall within.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
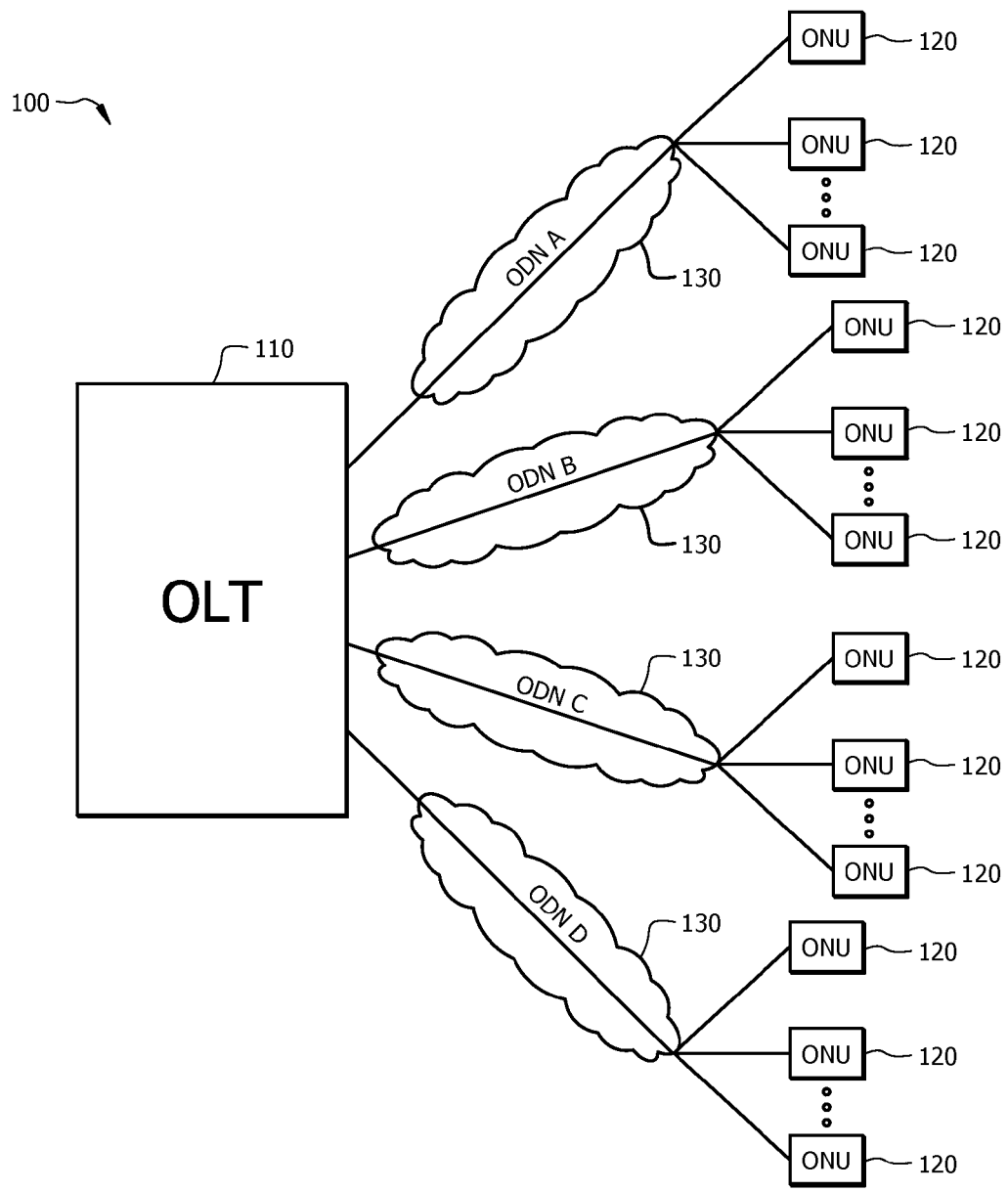
FIG. 1 is a schematic diagram of an embodiment of a PON sub-network system where embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There exist various PON protocols or standards, for example, asynchronous transfer mode PON (APON) and the broadband PON (BPON) defined by the International Telecommunication Union (ITU) Telecommunication Standardization Sector (ITU-T) G.983 standard, Gigabit PON (GPON) defined by the ITU-T G.984 standard, and Ethernet PON (EPON) defined by the Institute of Electrical and Electronics Engineers (IEEE) 802.3ah standard. Currently, GPON and EPON have been deployed worldwide for broadband services, providing aggregated bandwidth up to 2.5 Gbs. To satisfy ever-increasing bandwidth demands from end users, next generation 10 Gigabits (10G) PON, sometimes known as XG-PON or 10G EPON, with aggregated bandwidth of 10 Gbs have been standardized and are ready for large scale deployment. Beyond 10G PONs, future generations of optical access technologies, such as WDM PON, TWDm PON, Orthogonal Frequency Division Multiplexed (OFDM) PON and Optical Code Division Multiplexed (OCDM) PON, has been proposed and demonstrated with aggregated bandwidth of 40 Gb/s or higher.

Among these technologies, TWDM PON has been selected by the Full Service Access Network (FSAN) community as a primary broadband solution for future access networks. Such TWDM PON systems can provide 40 Gb/s aggregated capacity with 1:64 splitting ratio and 40 kilometers (km) reach, meeting operators' requirements for future broadband services. Anew set of standards on TWDM PON may pave the way for future large scale deployment. With multiple wavelengths and wavelength tunability, TWDM PON allows enhanced network functionalities unavailable in previous generations of pure TDM PONs. Incremental bandwidth upgrade and load balancing may be achieved in TWDM PON systems using tunable transmitters on an OLT line card. Energy efficient solutions may be implemented for TWDM PONs using dynamic wavelength routing.

Disclosed herein are at least one method, apparatus, and/or system for implementing one or more reconfigurable optical access network architectures that allocate OLT resources dynamically within a PON (e.g. TWDM PON). The reconfigurable optical access network architecture may arrange one or more ODNs in a PON to form a sub-network. Rather than having OLT resources confined to communicating over a single ODN, the OLT resources may be shared amongst the ODNs within a sub-network. In particular, each tunable transmitter in a tunable transmitter array may be able to access each of the ODNs located within the sub-network. In one embodiment, the tunable transmitter may dynamically access each of the ODNs using a cyclic arrayed waveguide grating (AWG) wavelength router and an optical coupler, such as a multi-mode interference coupler (MMI). One or more tunable transmitters within a tunable transmitter array may provide wavelengths for one or more ODNs. Additionally, the ODNs in a sub-network may be able to simultaneously implement a point to point and a point to multi-point connection with the OLT in the sub-network (e.g. a point to point and a point to multi-point connection can coexist in the sub-network). Specifically, the OLT may be configured to allocate a multiple channel receiver array that comprises a plurality of channel receivers. The number of channel receivers within the multiple channel receiver array may be equal to the maximum number of upstream wavelengths transmitted by the ONUs.

FIG. 1 is a schematic diagram of an embodiment of a PON sub-network system 100 where embodiments of the present disclosure may operate. The PON sub-network system 100 may be an optical access network or part of an optical access network that comprises an OLT 110, a plurality of ONUs 120, and a plurality of ODNs A-D 130. The OLT 110 may be coupled to one or more ODNs 130 and each of the ODNs 130 may be coupled to a set of ONUs 120. In one embodiment, the PON sub-network system 100 may be a communications network that does not comprise any active components to distribute data between the OLT 110 and the ONUs 120. Instead, the PON sub-network system 100 may use the passive optical components that include, but are not limited to isolators, circulators, filters, and unpowered splitters, in the ODN 130 (e.g. ODN A 130) to transport data between the OLT 110 and the ONUs 120. In another embodiment, the PON sub-network system 100 may comprise one or more active components, such as optical amplifiers and/or power splitters. The PON sub-network system 100 may be implemented as a Next Generation Access (NGA) system, such as an XGPON, which may have a downstream bandwidth of about 10 Gbs and an upstream bandwidth of at least about 2.5 Gbs. Alternatively, the PON sub-network system 100 may be implemented as an EPON, a 10 Gigabit EPON, an APON, a BPON, a GPON, a WDM PON, a TDM PON, a TWDM PON, and/or combinations thereof.

In an embodiment, the OLT 110 may be any device, such as an OLT line card, that is configured to communicate with the ONUs 120 and external network (not shown). Specifically, the OLT 110 may act as an intermediary between the external network (e.g. a service provider network) and the ONUs 120. For instance, the OLT 110 may forward data received from the external network to the ONUs 120 and forward data received from the ONUs 120 onto the external network. Although the specific configuration of the OLT 110 may vary depending on the type of PON sub-network system 100, in an embodiment, the OLT 110 may comprise a transmitter and a receiver. When the external network is using a network protocol, such as Ethernet or Synchronous Optical Networking/Synchronous Digital Hierarchy (SONET/SDH), that is different from the PON protocol used in the PON sub-network system 100, the OLT 110 may comprise a converter that converts the network protocol into the PON protocol. The OLT 110 converter may also convert the PON protocol into the network protocol. The OLT 110 may be located at a central location, such as a central office, but may be located at other locations as well.

In an embodiment, the ODNs A-D 130 may be a data distribution system, which may comprise optical fiber cables, couplers, splitters, distributors, and/or other network devices. In an embodiment, the optical fiber cables, couplers, splitters, distributors, and/or other equipment may be passive optical components. Specifically, the optical fiber cables, couplers, splitters, distributors, and/or other network devices may be components that do not require any power to distribute data signals between the OLT 110 and the ONUs 120. Alternatively, ODNs A-D 130 may comprise one or a plurality of active components, such as optical amplifiers. The ODNs A-D 130 may extend from the OLT 110 to the ONUs 120 in a branching configuration as shown in FIG. 1, but may be alternatively configured in any other point to multi-point configuration. ODNs A-D 130 may also be referenced as an optical access network and may be used interchangeably throughout this disclosure.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer and forward data received from the customer onto the OLT 110. Although the specific configuration of the ONUs 120 may vary depending on the type of PON sub-network system 100, in an embodiment, the ONUs 120 may comprise a tunable optical transmitter configured to send optical signals to the OLT 110 and a tunable optical receiver configured to select one of the downstream wavelength within an ODN 130 and receive optical signals in one downstream channel from the OLT 110. The transmitters for the ONUs 120 may comprise tunable lasers configured to tune to different wavelengths (e.g. $\lambda_1$-$\lambda_8$). Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to/from a customer device. In some embodiments, ONUs 120 and optical network terminals (ONTs) are similar, and thus the terms are used interchangeably throughout the disclosure. The ONUs 120 may be typically located at one or more distributed locations, such as the customer premises, but may also be located at other locations as well.

The PON sub-network system 100 may be arranged such that one or more ODNs 130 are coupled to the OLT 110. As shown in FIG. 1, the OLT 110 may be coupled to a plurality of ODNs 130, where each of the ODNs 130 is coupled to a set of ONUs 120. Using FIG. 1 as an example, a first set of ONUs 120 may be coupled to ODN A 130; a second set of ONUs 120 may be coupled to ODN B 130; a third set of ONUs 120 may be coupled to ODN C 130; and a fourth set of ONUs 120 may be coupled to ODN D 130. Each ODN 130 (e.g. ODN A 130) may comprise a splitter (e.g. a 1:64 splitter) and other suitable components (e.g. fiber) to transport the optical signal from the OLT to each of the ONUs 120. Additionally, the OLT 110 may be configured such that OLT resources (e.g. tunable transmitters) may be dynamically allocated to reach any of the ODNs A-D 130. Allocating OLT resources amongst the ODNs A-D 130 within the PON sub-network system 100 will be discussed in more detail in below.

Throughout this disclosure the term "upstream" refers to the direction that the optical signals travel from an ONU 120 to an OLT 110. The term "downstream" refers to the direction that the optical signals travel from an OLT 110 to an ONU 120. Additionally, the term "channel" and "wavelength band" may be used interchangeably throughout this disclosure and may refer to a wavelength or range of wavelengths used to encode, transmit, and/or receive data. For example, a downstream channel and/or wavelength band may have a wavelength value of about 1596 nanometers (nm) with a tolerance of plus or minus 0.1 nm for a certain downstream channel. In another example, an upstream channel and/or wavelength band may have wavelength value of about 1524 nanometers (nm) with a tolerance of plus or minus 0.2 nm to 0.3 nm for a certain upstream channel. Persons of ordinary skill in the art are aware that other tolerance ranges (e.g. ±0.2 nm) and other wavelength values may exist for a downstream channel, an upstream channel, and/or wavelength band. The term "tunable transmitter" may be interpreted throughout this disclosure to be a tunable laser without a modulator or a tunable laser with a modulator.

Figure 2:
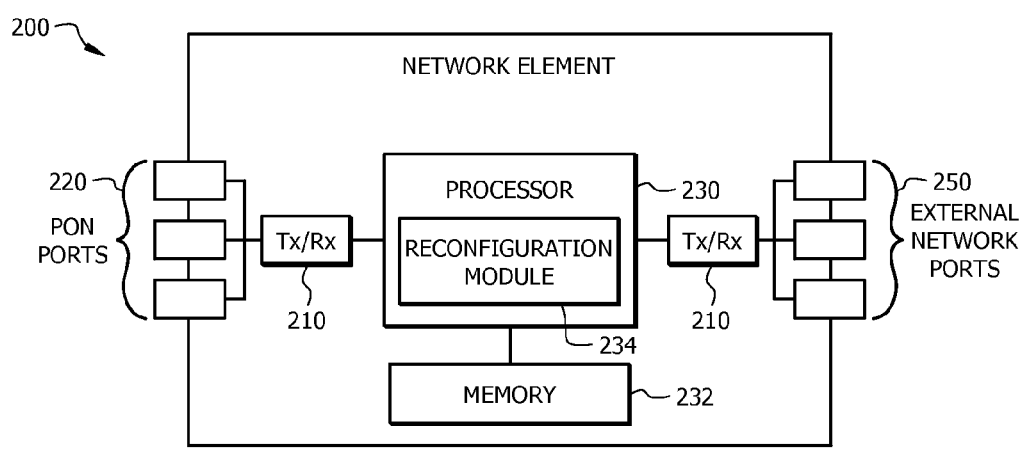
FIG. 2 is a schematic diagram of an embodiment of a network element within a PON sub-network.

FIG. 2 is a schematic diagram of an embodiment of a network element 200 within a PON sub-network. For example, the network element 200 may be an OLT 110, as described in FIG. 1, or a port within an OLT 110. The network element 200 may be suitable for implementing one or more embodiments of systems, methods, and schemes disclosed herein, such as method 1500. The network element 200 may be configured to transmit and/or receive optical signals that include, but are not limited to TWDM based transmissions over an optical fiber. The network element 200 may be implemented in a single node or the functionality of network element 200 may be implemented in a plurality of nodes. One skilled in the art will recognize that the term network element encompasses a broad range of devices of which network element 200 is merely an example. Network element 200 is included for purposes of clarity of discussion, but is in no way meant to limit the application of the present disclosure to a particular network element embodiment or class of network element embodiments. At least some of the features/methods described in the disclosure may be implemented in a network apparatus or component such as a network element 200. For instance, the features/methods in the disclosure may be implemented using hardware, firmware, and/or software installed to run on hardware.

As shown in FIG. 2, the network element 200 may comprise transceivers (Tx/Rx) 210, which may be transmitters, receivers, or combinations thereof. A Tx/Rx 210 may be coupled to a plurality of PON ports 220 (e.g. downstream interfaces) for transmitting and/or receiving frames from ONUs within an optical access networks and a Tx/Rx 210 coupled to a plurality of external network ports 250 (e.g. upstream interfaces) for transmitting and/or receiving frames from nodes with an external network, such as a metro network or a service provider core network. A processor 230 may be coupled to the Tx/Rxs 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more application specific integrated circuits (ASICs), field programmable gate array (FPGA), and/or digital signal processors (DSPs).

Processor 230 may comprise a reconfiguration module 234, which may implement the methods discussed herein, such as scheduling transmission of optical signals over one or more ODNs. The reconfiguration module 234 may determine the current traffic load for each of the ODNs and dynamically allocate a transmitter within a transmitter array to transmit the corresponding optical signal. In other words, the reconfiguration module 234 may select any of the transmitters and instruct the transmitter to be tuned to a specified wavelength in order to transmit optical signals over any one of the ODNs within a PON sub-network. In one embodiment, the reconfiguration module 234 may be implemented within the network element 200 when the network element 200 is an OLT. In another alternative embodiment, the reconfiguration module 234 may be implemented on a separate network element 200 external to an OLT. The PON ports 220 and/or external network ports 250 may comprise electrical and/or optical transmitting and/or receiving components.

It is understood that by programming and/or loading executable instructions onto the network element 200, at least one of the processor 230, reconfiguration module 234, Tx/Rxs 210, memory 232, PON ports 220, and/or external network ports 250 are changed, transforming the network element 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system (e.g., an OLT or an ONU) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (ROM) (CD-ROM), compact disc recordable (CD-R), compact disc rewritable (CD-RW), digital video disc (DVD), Blu-ray (registered trademark) disc (BD), and semiconductor memories (such as mask ROM, programmable ROM (PROM), erasable PROM, flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
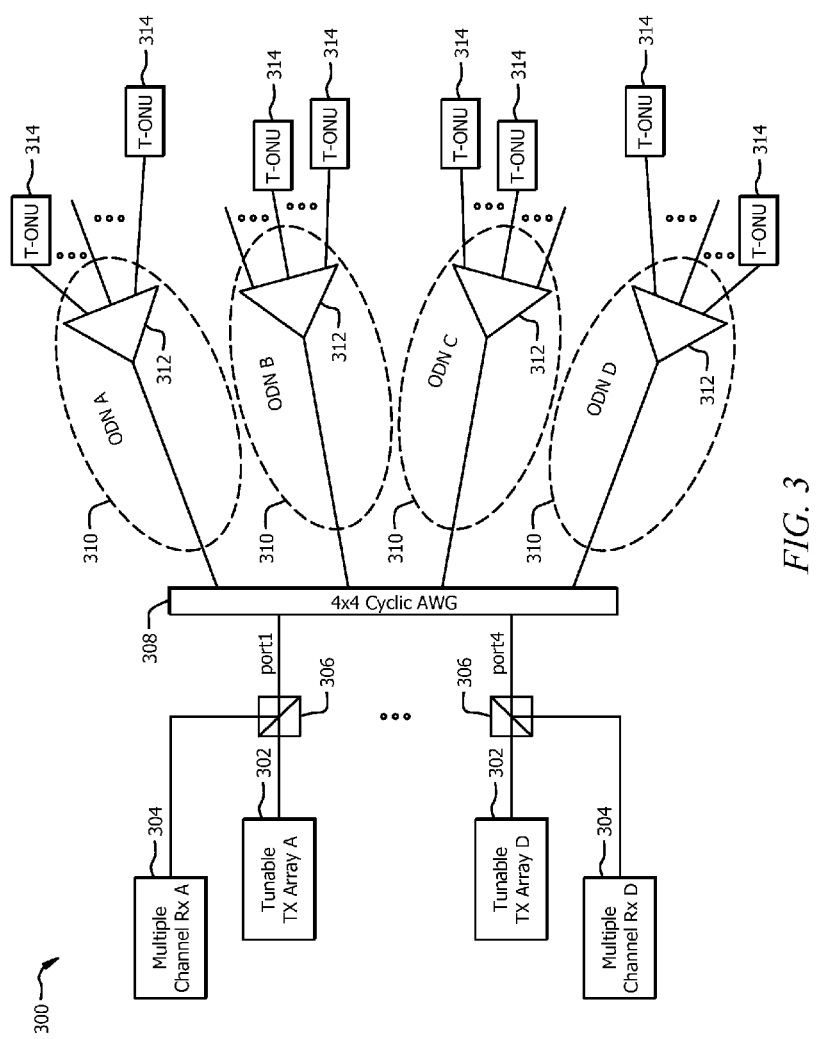
FIG. 3 is a schematic diagram of an embodiment of a reconfigurable PON architecture for a PON sub-network.

FIG. 3 is a schematic diagram of an embodiment of a reconfigurable PON architecture for a PON sub-network 300. The PON sub-network 300 comprises a plurality of tunable transmitter arrays A-D 302, a plurality of multiple channel receivers 304, a 4×4 cyclic AWG wavelength router 308, a plurality of ODNs A-D 310, a plurality of splitters 312, and a plurality of tunable ONUs (T-ONU) 314. The tunable transmitter arrays A-D 302 may comprise a plurality of tunable transmitters (not shown in FIG. 3). The tunable transmitters may be configured to tune to a plurality of wavelengths that may be used to encode and transmit data. The transmitter arrays A-D 302 may be located within a single OLT or may be located in different OLTs. In one embodiment, when the data traffic for the PON sub-network 300 is relatively low, some of the OLT resources, such as the tunable transmitter arrays A-D 302 and/or tunable transmitters may be put into sleep mode to conserve power consumption.

The multiple channel receivers 304 may comprise a plurality of channel receivers that are each configured to receive an upstream encoded wavelength (e.g. wavelength $\lambda_{1u}$). The number of channel receivers within the multiple channel receivers 304 may be the same as the maximum number of upstream wavelengths transmitted by the T-ONUs 314. For instance, if the tunable transmitters within T-ONUs 314 are configured to encode data using a maximum of eight different upstream wavelengths, then the multiple channel receivers 304 may comprise eight different channel receivers. The plurality of channel receivers may be used to establish point to point connections for upstream transmission from the T-ONUs 314. Implementing point to point connections may be beneficial in backhaul type networks (e.g. wireless backhaul network) or immersive video tele-presenting applications (e.g. tele-dynamic show).

The upstream encoded wavelengths received by each multiple channel receiver 304 may correspond to the wavelengths transmitted by the tunable transmitter array 302 for a given wavelength order. Using FIG. 3 as an example, if tunable transmitter array A 302 encodes downstream data using wavelengths $\lambda_{1d}$, $\lambda_{2d}$, and $\lambda_{3d}$, then the multiple channel receiver 304 corresponding to tunable transmitter array A 302 may receive upstream data encoded using wavelengths $\lambda_{1u}$, $\lambda_{2u}$, and $\lambda_{3u}$, which may come from one ODN 310 or multiple ODNs 310. The downstream wavelengths and the corresponding upstream wavelengths may not have the same wavelength value. For example, downstream wavelength $\lambda_{1d}$ may have a wavelength range of 1596 nm to 1605 nm, and the upstream wavelength $\lambda_{1u}$ may have a wavelength range of 1524 nm to 1544 nm. Instead, labeling wavelengths $\lambda_{1d}$, $\lambda_{2d}$, and $\lambda_{3d}$, and $\lambda_{1u}$, $\lambda_{2u}$, and $\lambda_{3u}$ represents the order of wavelength values from the shortest wavelength value to the longest wavelength. For the above downstream and upstream wavelength sequences, the wavelengths labeled $\lambda_{1d}$ and $\lambda_{1u}$ have the shortest wavelength in the downstream direction and upstream direction, respectively, and the wavelengths labeled $\lambda_{3d}$ and $\lambda_{3u}$ have the longest wavelength in the downstream direction and upstream direction, respectively. In one embodiment, if one downstream wavelength $\lambda_{1d}$ is received by one of the T-ONUs 310, the T-ONU 310 that received downstream wavelength $\lambda_{1d}$ can emit an upstream wavelength $\lambda_{1u}$ to reach the corresponding optical channel that emits downstream wavelength $\lambda_{1d}$ or the same port receiver of the 4×4 cyclic AWG wavelength router 308. Throughout the disclosure, labeling wavelengths, such as $\lambda_{1d}$ and $\lambda_{1u}$, represent the wavelengths the transceiver at the OLT emits and receives, respectively.

An optical filter 306, such as a WDM filter, may be positioned in between the AWG wavelength router 308 and the transmitter arrays A-D 302/multiple channel receivers 304. The optical filters 306 may provide wavelength sensitive loss, isolation and/or return loss. The optical filters 306 may be in-line, wavelength selective, components that allow a specific range of wavelengths to pass through and/or reflect with low attenuation. In FIG. 3, the optical filters 306 may be used to separate out upstream optical signals from downstream optical signals such that upstream optical signals are reflected to the multiple channel receivers 304 and the downstream optical signals are passed through to the 4×4 cyclic AWG wavelength router 308. In another embodiment, the optical filters 306 may be placed between the 4×4 cyclic AWG wavelength router 308 and the ODN networks 310. The optical filters 306 may reside in the OLT or ODNs 310.

In FIG. 3, the tunable transmitter arrays A-D 302 and the multiple channel receivers 304 are coupled to 4×4 cyclic AWG wavelength router 308. The 4×4 cyclic AWG wavelength router 308 may comprise four input ports and four output ports. The 4×4 notation refers the number of input ports (e.g. 4 inputs) and the number of output ports (4 outputs) in a downstream direction. The input ports are coupled to the tunable transmitter arrays A-D 302 and each of the output ports are coupled to one of the ODNs A-D 310. For example, one of the output ports for the 4×4 cyclic AWG wavelength router 308 is coupled to ODN A 310 and a separate output port is coupled to ODN B 310. The 4×4 cyclic AWG wavelength router 308 may be configured to route predefined wavelength bands with certain channel spacing received at an input port to a predetermined output port. The 4×4 cyclic AWG wavelength router 308 may be configured with a cyclic nature that output wavelengths in a repeating order (e.g. based on input ports) for each of the output ports. In one embodiment, the 4×4 cyclic AWG wavelength router 308 may be a hybrid device that comprises a 4×4 AWG wavelength router and a 4×4 power splitter (not shown in FIG. 3) that may amplify downstream and upstream light functions. Although FIG. 3 illustrates the use of a 4×4 cyclic AWG wavelength router 308, other optical routing or switch devices, such as a multi-input port and multi-output port, free space, cyclic wavelength router or switching device, may be used route wavelengths received at an input to a designated output in repeating order.

The 4×4 cyclic AWG wavelength router 308 may output the downstream optical signals allocated for the ODNs A-D 310 to reach the T-ONUs 314. ODNs A-D 310 and T-ONUs 314 may be substantially similar to ODNs 130 and ONUs 120 as described in FIG. 1, respectively. Additionally, each of the ODNs A-D 310 may comprise a splitter 312 that receives the downstream optical signal from the 4×4 cyclic AWG wavelength router 308. The splitter 312 may be a passive optical device that splits the downstream optical signal to a plurality of split optical signals and sends the split optical signals to different T-ONUs 314. Each of the splitters 312 may be configured as a 1:32, 1:64, 1:128, or any other splitter ratio and may split an incoming downstream optical signal based on the different wavelengths used to encode the incoming downstream optical signal. In the upstream direction, T-ONUs 314 may comprise tunable transmitters used to transmit optical signals in the upstream direction. The splitters 312 may merge the different upstream wavelengths received from T-ONUs 314 into a single upstream optical fiber and send the merged multi-wavelength upstream optical signal to the 4×4 cyclic AWG wavelength router 308.

Figure 4:
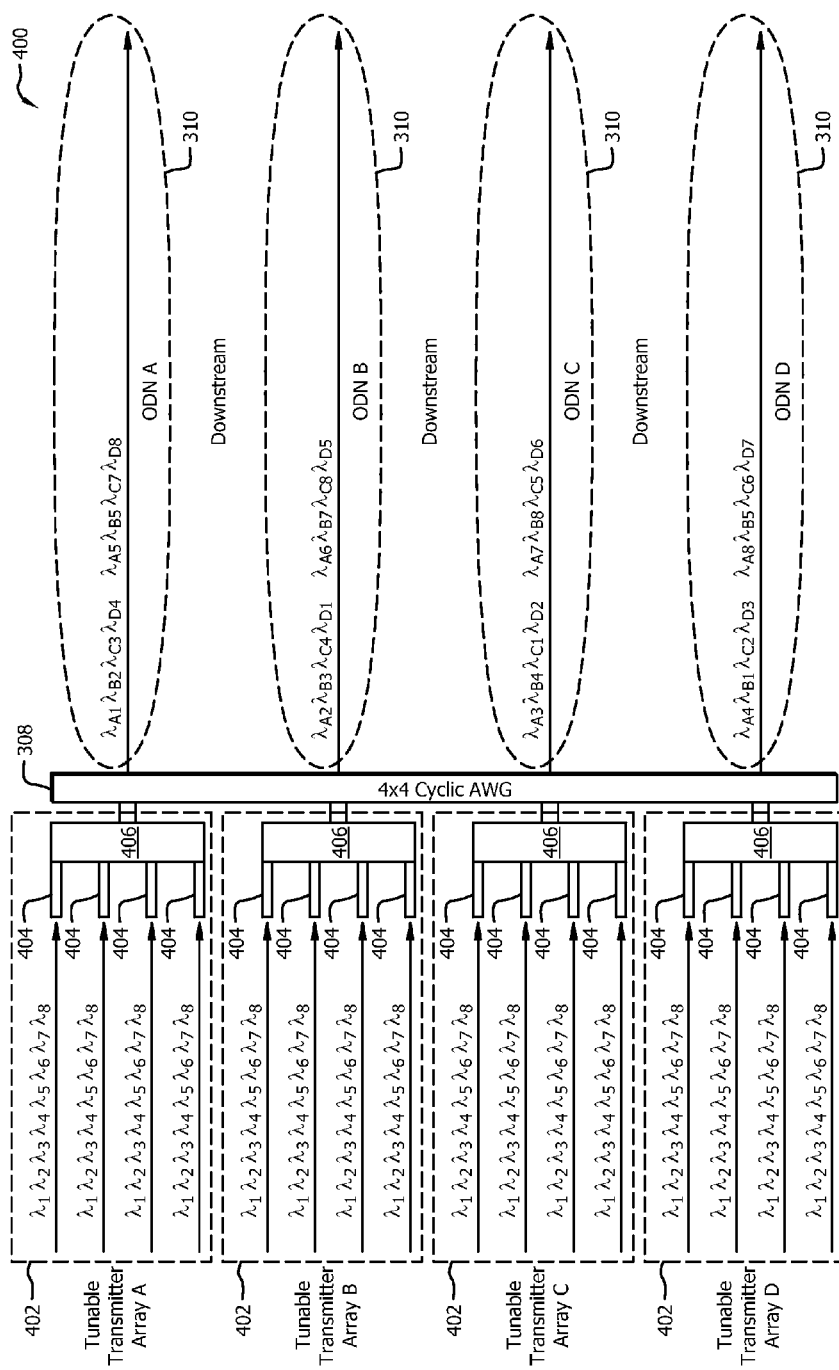
FIG. 4 is a schematic diagram of an embodiment of a reconfigurable PON sub-network with an eight wavelength tuning range.

FIG. 4 is a schematic diagram of an embodiment of a reconfigurable PON sub-network 400 with an eight wavelength tuning range. The reconfigurable PON sub-network 400 comprises a plurality of tunable transmitter arrays A-D 402, a 4×4 cyclic AWG wavelength router 308 and a plurality of ODNs A-D 310. Each of the tunable transmitter arrays A-D 402 comprises a plurality of tunable transmitters 404. As shown in FIG. 4, each of the tunable transmitters 404 may be configured to tune to eight different wavelength bands. In other words, the tunable transmitters 404 may be able to encode and transmit data using eight different optical channels. In one embodiment, the nominal channel space between two wavelength bands (e.g. between $\lambda_1$ and $\lambda_2$) may be about 100 gigahertz (GHz) or about 0.8 nm. When factoring the tolerance for each of the optical channel wavelength positions the actual channel space may be about 0.6 nm for a tolerance of about 0.1 nm or about 0.4 nm (about 50 GHz) for a tolerance of about 0.2 nm.

In FIG. 4, the eight different wavelength bands that each of tunable transmitters 404 may use to encode optical signals are denoted as $\lambda_1$-$\lambda_8$. Within each tunable transmitter arrays A-D 402, the tunable transmitters 404 may be coupled to an optical coupler 406 (e.g. MMI or star coupler). The optical coupler 406 combines the optical signals transmitted from each of the tunable transmitters 404 for a given tunable transmitter array 402 (e.g. tunable transmit array A 402) and outputs a combined optical signal that feeds into the 4×4 cyclic AWG wavelength router 308. The tunable transmitter arrays A-D 402, tunable transmitters 404, and optical coupler 406 will be discussed in more detail in FIG. 14.

FIG. 4 also illustrates the wavelength output arrangement of the 4×4 cyclic AWG wavelength router 308 over the different ODNs A-D 310. Recall that the 4×4 cyclic AWG wavelength router 308 may be configured with a cyclic nature that repeats orders and may allocate predefined wavelength bands received from the input ports to certain output ports. For each output port, the 4×4 cyclic AWG wavelength router 308 routes wavelength bands $\lambda_1$-$\lambda_8$ to different ODNs A-D 310 depending on the input of the 4×4 cyclic AWG wavelength router 308. Each of the inputs of the 4×4 cyclic AWG wavelength router 308 are coupled to different tunable transmitter arrays A-D 402. Using FIG. 4 as an example, the eight different wavelength bands that may be outputted to ODN A 310 are labeled as $\lambda_{A1}$, $\lambda_{B2}$, $\lambda_{C3}$, $\lambda_{D4}$, $\lambda_{A5}$, $\lambda_{B6}$, $\lambda_{C7}$, and $\lambda_{D8}$. Label $\lambda_1$ indicates that the 4×4 cyclic AWG wavelength router 308 has been configured such that wavelength band $\lambda_1$ is emitted from tunable transmitter array A 402; label $\lambda_{B2}$ indicates that the wavelength band $\lambda_2$ is emitted from tunable transmitter array B 402; label $\lambda_{C3}$ indicates that the wavelength band $\lambda_3$ is emitted from tunable transmitter array C 402; and label $\lambda_{D4}$ indicates that the wavelength band $\lambda_4$ is emitted from tunable transmitter array D 402.

The label $\lambda_{A5}$ indicates that the 4×4 cyclic AWG wavelength router 308 has been configured to return to the input associated with tunable transmitter array A 402 to emit wavelength band $\lambda_5$ for ODN A 310. To output wavelength bands $\lambda_6$, $\lambda_7$, and $\lambda_8$ to ODN A 310, the 4×4 cyclic AWG wavelength router 308 repeats the same order for $\lambda_2$, $\lambda_3$, and $\lambda_4$. Specifically, labels $\lambda_{B6}$, $\lambda_{C7}$, and $\lambda_{D8}$ correspond to the 4×4 cyclic AWG wavelength router 308 routing inputs that correspond to the tunable transmitter array B 402, tunable transmitter array C 402, and tunable transmitter array D 402 to emit wavelength bands $\lambda_6$, $\lambda_7$, and $\lambda_4$, respectively. Similar label notation is used for the wavelength bands $\lambda_1$-$\lambda_8$ that 4×4 cyclic AWG wavelength router 308 outputs to the other ODNs B-D 310.

Each of the tunable transmitters 404 within each of the tunable transmitter arrays A-D 402 may access any of the ODNs A-D 310 by tuning the tunable transmitters 404 to encode data at a certain wavelength band. For example, for a tunable transmitter 404 within tunable transmitter array A 402 (e.g. top most tunable transmitter 404) to access ODN A 310, the tunable transmitter 404 may be tuned to wavelength bands $\lambda_1$ or $\lambda_5$. To access ODN B 310, the tunable transmitter 404 may be tuned to wavelength bands $\lambda_2$ or $\lambda_6$; to access ODN C 310, the tunable transmitter 404 may be tuned to wavelength bands $\lambda_3$ or $\lambda_7$; and to access ODN D 310, the tunable transmitter 404 may be tuned to wavelength bands $\lambda_4$ or $\lambda_8$. Other tunable transmitters 404 within other tunable transmitter arrays B-D 402 may be tuned to other wavelength bands in order to access the same ODNs A-D 310 as shown in FIG. 4. Persons of ordinary skill in the art are aware that other combination of wavelength sequences may be output to the ODNs A-D 310 and that the disclosure is not limited to only the specific applications in the FIG. 4 other figures (e.g. FIGS. 5-13). The use and discussion in FIG. 4 and other figures (e.g. FIGS. 5-13) are only an example to facilitate ease of description and explanation.

The OLT may dynamically increase or decrease the data rate capacity (e.g. bandwidth) for each of the ODNs A-D 310 by adjusting the number of wavelengths allocated to encode and transmit data for each of the ODNs A-D 310. Using FIG. 4 as an example, the OLT may initially allocate transmission of four downstream wavelengths on each ODNs A-D 310 simultaneously using the 16 different tunable transmitters. After determining the traffic load and other network conditions for each for ODNs A-D 310, the OLT may dynamically adjust the number of downstream wavelengths assigned to each ODNs A-D 310 by re-tuning one or more of the tunable laser transmitters 404 in one or more tunable transmitter arrays A-D 402. For example, the OLT may dynamically allocate wavelengths for the tunable transmitter arrays A-D 402 to transmit within one ODN.

Figure 5:
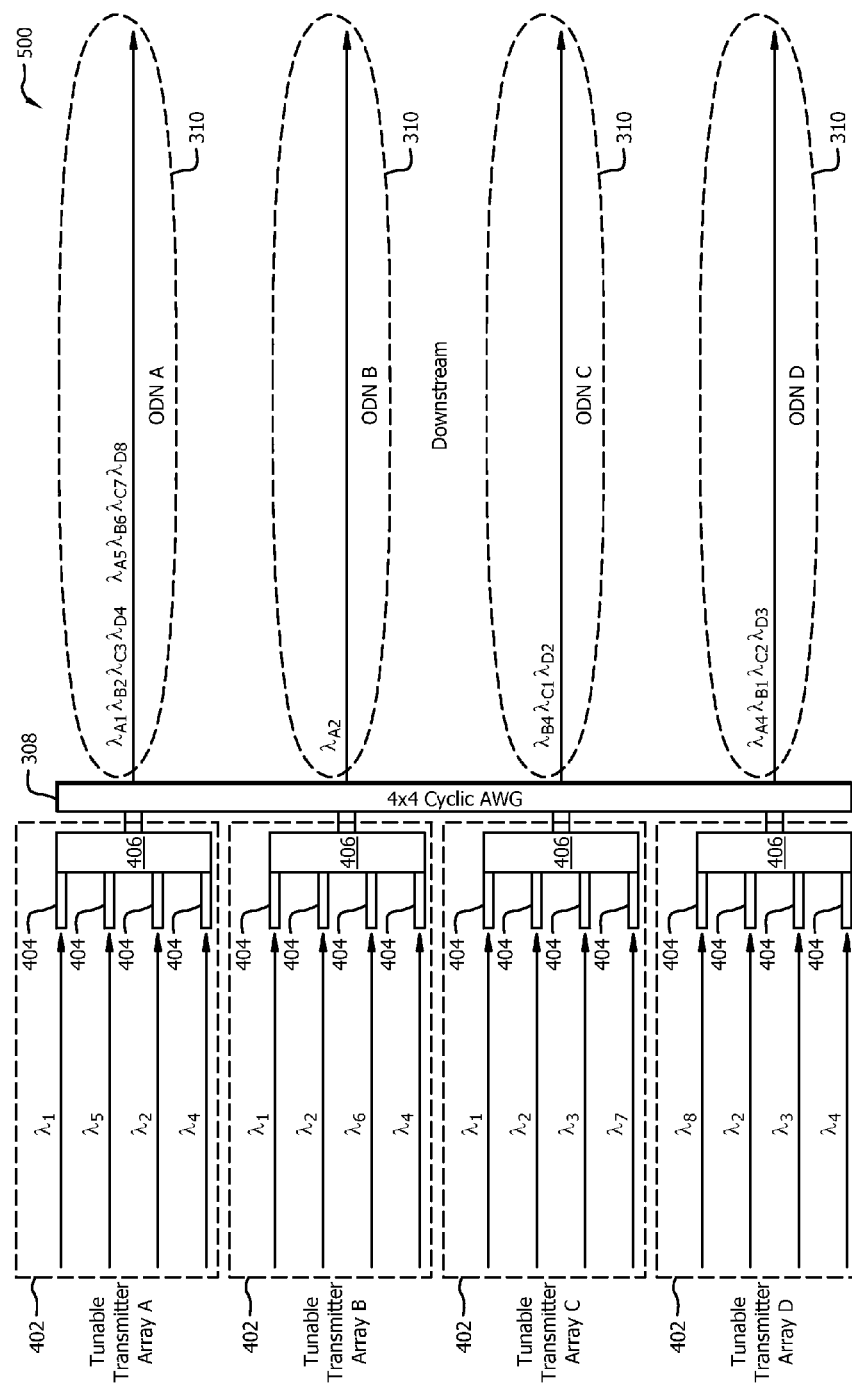
FIG. 5 is a schematic diagram of another embodiment of a reconfigurable PON sub-network with an eight wavelength tuning range.

FIG. 5 is a schematic diagram of another embodiment of a reconfigurable PON sub-network 500 with an eight wavelength tuning range. FIG. 5 illustrates an example case of allocating OLT resource for downstream transmission of wavelengths over different ODNs A-D 310 using 16 different tunable transmitters 404. In FIG. 5, each of the tunable transmitter arrays A-D 402 comprise four different tunable transmitters. The four tunable transmitters 404 within tunable transmitter array A 402 may be tuned to wavelength bands $\lambda_1$, $\lambda_5$, $\lambda_2$, and $\lambda_4$; the four tunable transmitters 404 within tunable transmitter array B 402 may be tuned to wavelength bands $\lambda_1$, $\lambda_2$, $\lambda_6$, and $\lambda_4$; the four tunable transmitters 404 within tunable transmitter array C 402 may be tuned to wavelength bands $\lambda_1$, $\lambda_2$, $\lambda_3$, and $\lambda_7$; and the four tunable transmitters 404 within tunable transmitter array D 402 may be tuned to wavelength bands $\lambda_8$, $\lambda_2$, $\lambda_3$, and $\lambda_4$.

The 16 different tunable transmitters 404 encode data using the wavelength bands to access different ODNs A-D 310. In FIG. 5, two tunable transmitters 404 within each of the tunable transmitter arrays A-D 402 are used to transmit wavelengths labeled $\lambda_{A1}$, $\lambda_{B2}$, $\lambda_{C3}$, $\lambda_{D4}$, $\lambda_{A5}$, $\lambda_{B6}$, $\lambda_{C7}$, and $\lambda_{D8}$ for ODN A 310. In particular, two tunable transmitters 404 within tunable transmitter array A 402 emit the wavelengths labeled $\lambda_{A1}$ and $\lambda_{A5}$; two tunable transmitters 404 within tunable transmitter array B 402 emit the wavelengths labeled $\lambda_{B2}$ and $\lambda_{B6}$; two tunable transmitters 404 within tunable transmitter array C 402 emit the wavelengths labeled $\lambda_{C3}$ and $\lambda_{C7}$; and two tunable transmitters 404 within tunable transmitter array D 402 emit the wavelengths labeled $\lambda_{D4}$ and $\lambda_{D8}$. For ODN B 310, a tunable transmitter 404 within tunable transmitter array A 402 emits the wavelength labeled $\lambda_2$; for ODN C 310, a tunable transmitter 404 within tunable transmitter array B 402, tunable transmitter array C 402, and tunable transmitter array D 402 emit the wavelengths labeled $\lambda_{4B}$, $\lambda_{C1}$, and $\lambda_{D2}$, respectively; and for ODN D 310, a tunable transmitter 404 within tunable transmitter array A 402, tunable transmitter array B 402, tunable transmitter array C 402, and tunable transmitter array D 402 emit the wavelengths labeled $\lambda_{A4}$, $\lambda_{B1}$, $\lambda_{C2}$, and $\lambda_{D3}$, respectively. If each of the wavelength bands (e.g. $\lambda_{A1}$) represents about a 10 Gbs optical channel, then the transmission of wavelength bands $\lambda_1$, $\lambda_{B2}$, $\lambda_{C3}$, $\lambda_{D4}$, $\lambda_{A5}$, $\lambda_{B6}$, $\lambda_{C7}$, and $\lambda_{D8}$ over ODN A 310 may represent a data rate of about 80 Gbs allocated to ODN A 310. ODN B 310, ODN C 310, and ODN D 310 may be allocated with a data rate of 10 Gbs, 30 Gbs, and 40 Gbs, respectively.

The number of wavelength bands allocated for each of the ODNs A-D 310 may be dependent on traffic load and other network conditions for the ODNs A-D 310. For example, the OLT that houses tunable transmitter arrays A-D 402 may determine that ODN A 310 may be associated with a large enterprise network that may require a substantial amount of OLT resources during a certain time period (e.g. during a work day), and ODN B 310 may be associated with residential networks that may require relatively less OLT resources during the same time period. As such, the OLT may allocate more OLT resources (e.g. tunable transmitters 404) to the large enterprise network by tuning eight of the 16 tunable transmitters 404 to wavelength bands allocated for ODN A 310 for the certain time period. The OLT resources may subsequently be reconfigured or reallocated to dynamically provide a more efficient, scalable, flexible, and reconfigurable PON network. For instance, after the certain time period expires (e.g. during a weekend), the OLT resources may be reconfigured such that relatively less OLT resources are allocated to ODN A 310 and relatively more OLT resources are allocated to ODN B 310.

Figure 6:
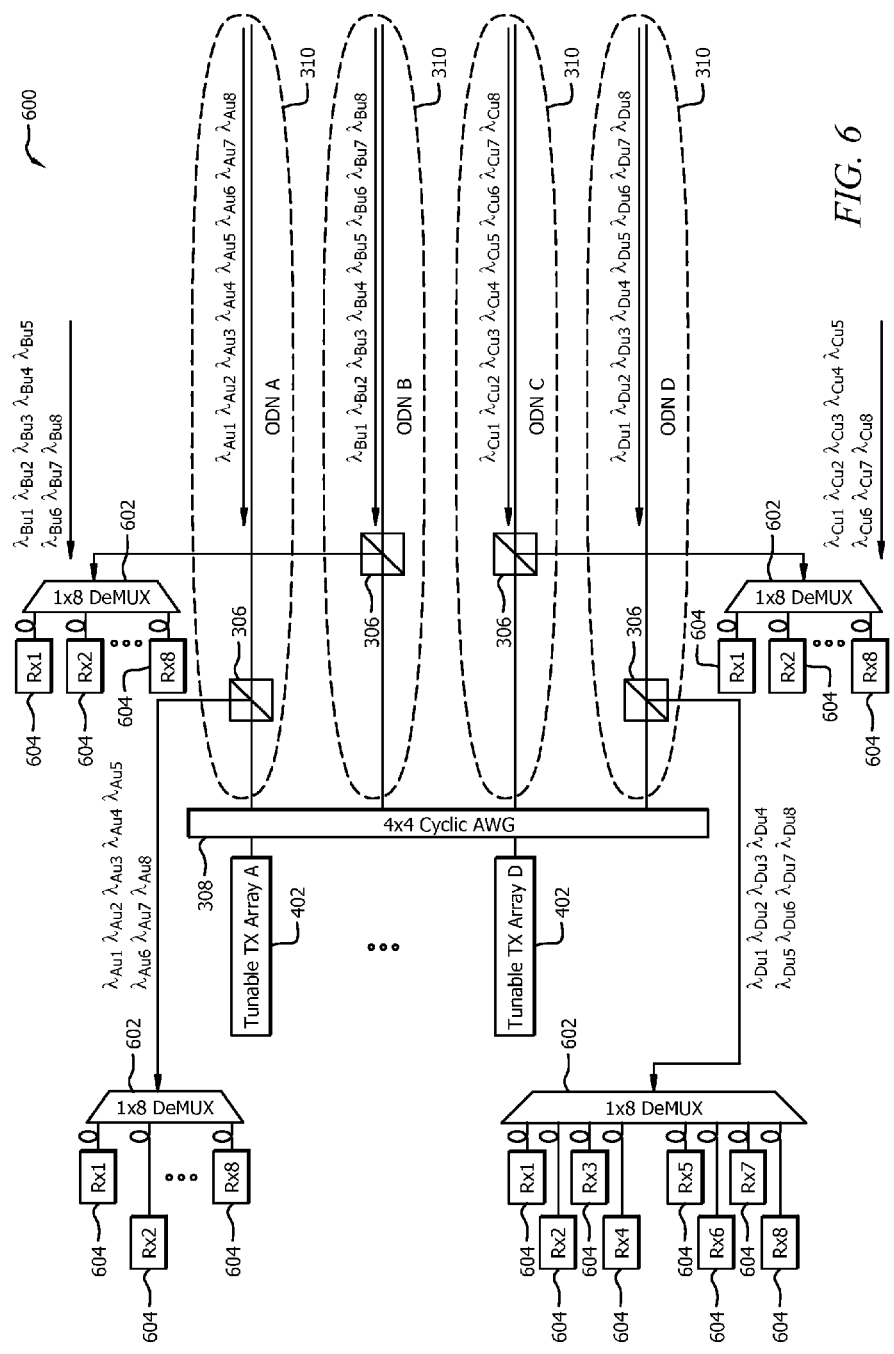
FIG. 6 is a schematic diagram of an embodiment of a reconfigurable PON sub-network with an eight wavelength tuning range and comprises a plurality of multiple channel receivers to receive upstream wavelengths from a plurality of ONUs.

FIG. 6 is a schematic diagram of an embodiment of a reconfigurable PON sub-network 600 with an eight wavelength tuning range and comprises a plurality of multiple channel receivers to receive upstream wavelengths from a plurality of ONUs. The reconfigurable PON sub-network 600 is substantially similar to the reconfigurable PON sub-network 400 in FIG. 4 except that the reconfigurable PON sub-network 600 further comprises a plurality of multiple channel receivers and a plurality of optical filters 306 that route upstream optical signals to the multiple channel receivers prior to reaching the 4×4 cyclic AWG wavelength router 308. Each of the multiple channel receivers comprises a 1×8 demultiplexer 602 and a plurality of channel receivers Rx1-Rx8 604. Each of the 1×8 demultiplexers 602 may be an active or a passive demultiplexer that receives an upstream optical signal within one of the ODNs A-D 310 and separates out the different wavelength bands within the optical signal and sends the wavelength bands to the corresponding channel receivers 604. Each of the upstream wavelength bands received at the 1×8 demultiplexers 602 may be from tunable ONU transmitters associated with each of the ODNs A-D 310. The number of output channels in the upstream direction for the 1×8 demultiplexers 602 may be the same as the number of maximum upstream wavelengths tunable by the ONUs.

The multiple channel receiver that is coupled to ODN A 310 may receive an upstream optical signal that comprises wavelength bands $\lambda_{AU1}$, $\lambda_{AU2}$, $\lambda_{AU3}$, $\lambda_{AU4}$, $\lambda_{AU5}$, $\lambda_{AU6}$, $\lambda_{AU7}$, and $\lambda_{AU8}$ that are transmitted from ONUs coupled to ODN A 310; the multiple channel receiver that is coupled to ODN B 310 may receive an upstream optical signal that comprises wavelength bands $\lambda_{BU1}$, $\lambda_{BU2}$, $\lambda_{BU3}$, $\lambda_{BU4}$, $\lambda_{BU5}$, $\lambda_{BU6}$, $\lambda_{BU7}$, and $\lambda_{BU8}$ that are transmitted from ONUs coupled to ODN B 310; the multiple channel receiver that is coupled to ODN C 310 may receive an upstream optical signal that comprises wavelength bands $\lambda_{CU1}$, $\lambda_{CU2}$, $\lambda_{CU3}$, $\lambda_{CU4}$, $\lambda_{CU5}$, $\lambda_{CU6}$, $\lambda_{CU7}$, and $\lambda_{CU8}$ that are transmitted from ONUs coupled to ODN C 310; and the multiple channel receiver that is coupled to ODN D 310 may receive an upstream optical signal that comprises wavelength bands $\lambda_{DU1}$, $\lambda_{DU2}$, $\lambda_{DU3}$, $\lambda_{DU4}$, $\lambda_{DU5}$, $\lambda_{DU6}$, $\lambda_{DU7}$, and $\lambda_{DU8}$ that transmitted from ONUs coupled to ODN D 310. For FIG. 6, the labels $\lambda_{AU1}$-$\lambda_{AU8}$, $\lambda_{BU1}$-$\lambda_{BU8}$, $\lambda_{CU1}$-$\lambda_{CU8}$, and $\lambda_{DU1}$-$\lambda_{DU8}$ represent the different upstream wavelength bands $\lambda_1$-$\lambda_8$ received from the different ODNs A-D 310.

The different upstream wavelength bands for each ODN A-D 310 in FIG. 6 represents that any ONU or user may tune its upstream tunable transmitter to any one of the upstream wavelengths bands $\lambda_1$-$\lambda_8$. In one embodiment, the number of channel receivers 604 for each ODN A-D 310 may correspond to the maximum number of wavelengths bands the ONUs are able to tune to. In FIG. 6, each of the channel receivers Rx1, Rx2, Rx3, Rx4, Rx5, Rx6, Rx7, Rx8 604 may be designated to receive the data encoded in one of the upstream wavelength bands $\lambda_1$, $\lambda_2$, $\lambda_3$, $\lambda_4$, $\lambda_5$, $\lambda_6$, $\lambda_7$, and $\lambda_8$, respectively. By having the number of channel receivers equal to the maximum number of upstream wavelength bands, the ONUs may be able to implement point to multi-point connections and point to point connections simultaneously, which may be beneficial in backhaul type networks (e.g. wireless backhaul) or immersive video tele-presenting applications (e.g. tele-dynamic show). For the FIG. 6 use case example, there are 16 tunable transmitters and 32 channel receivers at OLT side, where 16 of the 32 channel receivers may be used for point to point connections. Although FIG. 6 illustrates that each of the ODNs A-D 310 are able to transport eight upstream wavelengths to the OLT, the actual number of upstream wavelength transmitted for each of the ODNs A-D 310 may have a range of about four for symmetrical downstream and upstream TWDM-PON architecture.

Figure 7:
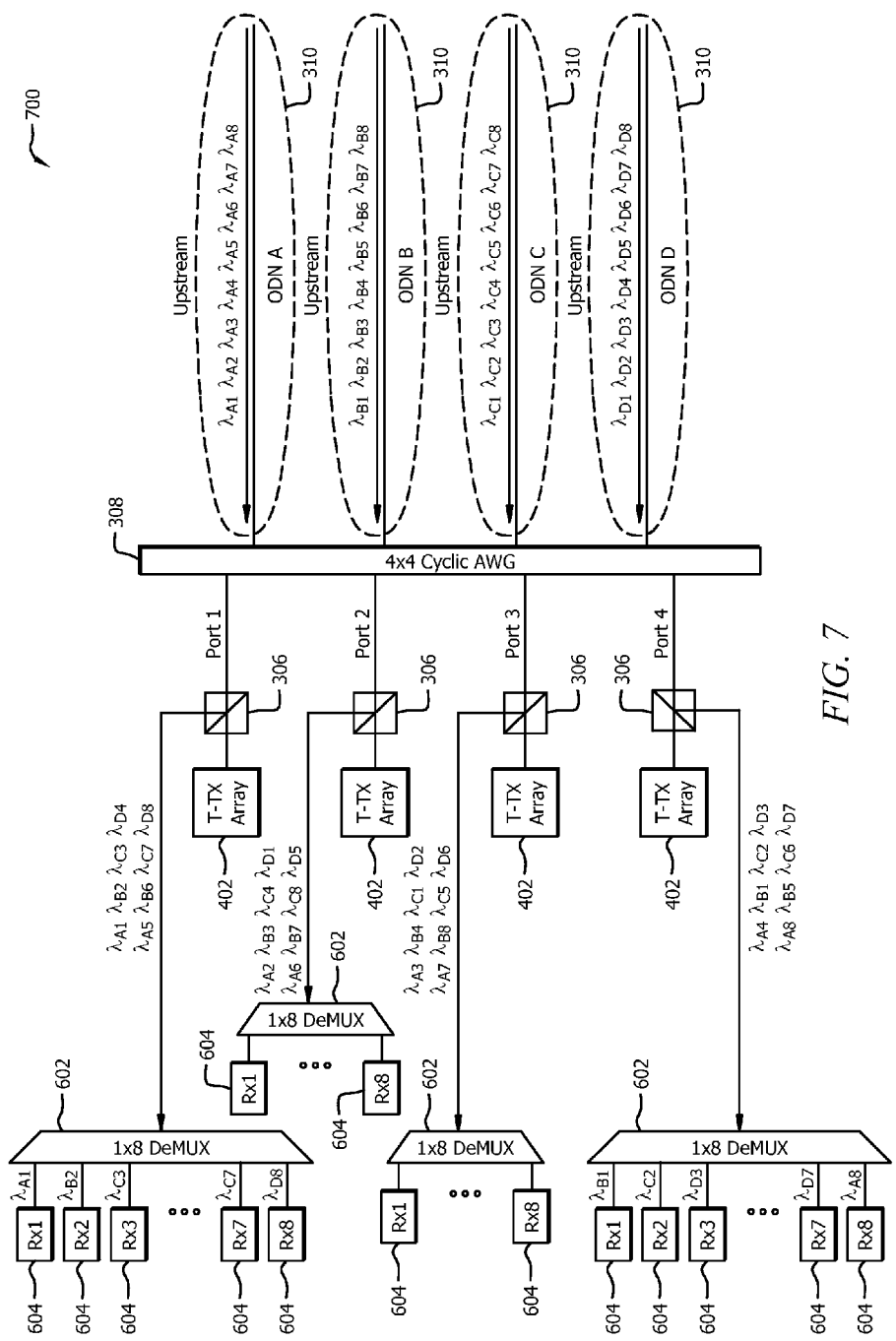
FIG. 7 is a schematic diagram of another embodiment of a reconfigurable PON sub-network with an eight wavelength tuning range and comprises a plurality of multiple channel receivers to receive upstream wavelengths from a plurality of ONUs.

FIG. 7 is a schematic diagram of another embodiment of a reconfigurable PON sub-network 700 with an eight wavelength tuning range and comprises a plurality of multiple channel receivers to receive upstream wavelengths from a plurality of ONUs. The reconfigurable PON sub-network 700 is substantially similar to the reconfigurable PON sub-network 600 in FIG. 6 except that the optical filters 306 are positioned between the tunable transmitter array 402 and the 4×4 cyclic AWG wavelength router 308. Each optical filter 306 routes the upstream wavelength bands to the 1×8 demultiplexer 602 after the upstream wavelengths pass through the 4×4 cyclic AWG wavelength router 308. The 4×4 cyclic AWG wavelength router 308 may be configured such that upstream wavelengths $\lambda_1$-$\lambda_8$ received by the ODNs A-D 310 in the upstream direction is output to different 4×4 cyclic AWG wavelength router 308 ports 1-4 based on a repeating and predetermined order. As shown in FIG. 7, the upstream optical signal received from port 1 of the 4×4 cyclic AWG wavelength router 308 may comprise upstream wavelengths $\lambda_{A1}$, $\lambda_{B2}$, $\lambda_{C3}$, $\lambda_{D4}$, $\lambda_{A5}$, $\lambda_{B6}$, $\lambda_{C7}$, and $\lambda_{D8}$. Labels $\lambda_{A1}$ and $\lambda_{A5}$ may represent that wavelengths $\lambda_1$ and $\lambda_5$ are from ODN A 310; labels $\lambda_{B2}$ and $\lambda_{B6}$ may represent that wavelengths $\lambda_2$ and $\lambda_6$ are from ODN B 310; labels $\lambda_{C3}$ and $\lambda_{C7}$ may represent that wavelengths $\lambda_3$ and $\lambda_7$ are from ODN C 310; and labels $\lambda_{D4}$ and $\lambda_{D8}$ may represent that wavelengths $\lambda_1$ and $\lambda_8$ are from ODN D 310. Wavelengths received at ports 2-4 of the 4×4 cyclic AWG wavelength router 308 may be labeled in a similar notation as described for port 1.

The upstream wavelengths received at ports 1-4 of the 4×4 cyclic AWG wavelength router 308 may then be inputted into the optical filters 306. The optical filters 306 may send the upstream wavelengths to the 1×8 demultiplexer 602 which separates out and sends the corresponding wavelengths to the channel receivers Rx1-Rx8 604. In FIG. 7, channel receivers Rx1, Rx2, Rx3, Rx4, Rx5, Rx6, Rx7, and Rx8 604 that are coupled to port 1 of the 4×4 cyclic AWG wavelength router 308 may receive $\lambda_{A1}$, $\lambda_{B2}$, $\lambda_{C3}$, $\lambda_{D4}$, $\lambda_{A5}$, $\lambda_{B6}$, $\lambda_{C7}$, and $\lambda_{D8}$, respectively, after passing through the 1×8 demultiplexer 602. The other channel receivers Rx1-Rx8 604 that are coupled to ports 2-4 of the 4×4 cyclic AWG wavelength router 308 may be designated to receive certain wavelengths from different ODNs A-D 310 similar to channel receivers Rx1-Rx8 604 that are coupled to port 1 of the 4×4 cyclic AWG wavelength router 308. Similar to FIG. 6, the number of channel receivers in each multiple channel receiver and the number of outputs channels for the 1×8 demultiplexer 602 may be the same number as the maximum number upstream wavelengths transmitted by the ONUs.

Figure 8:
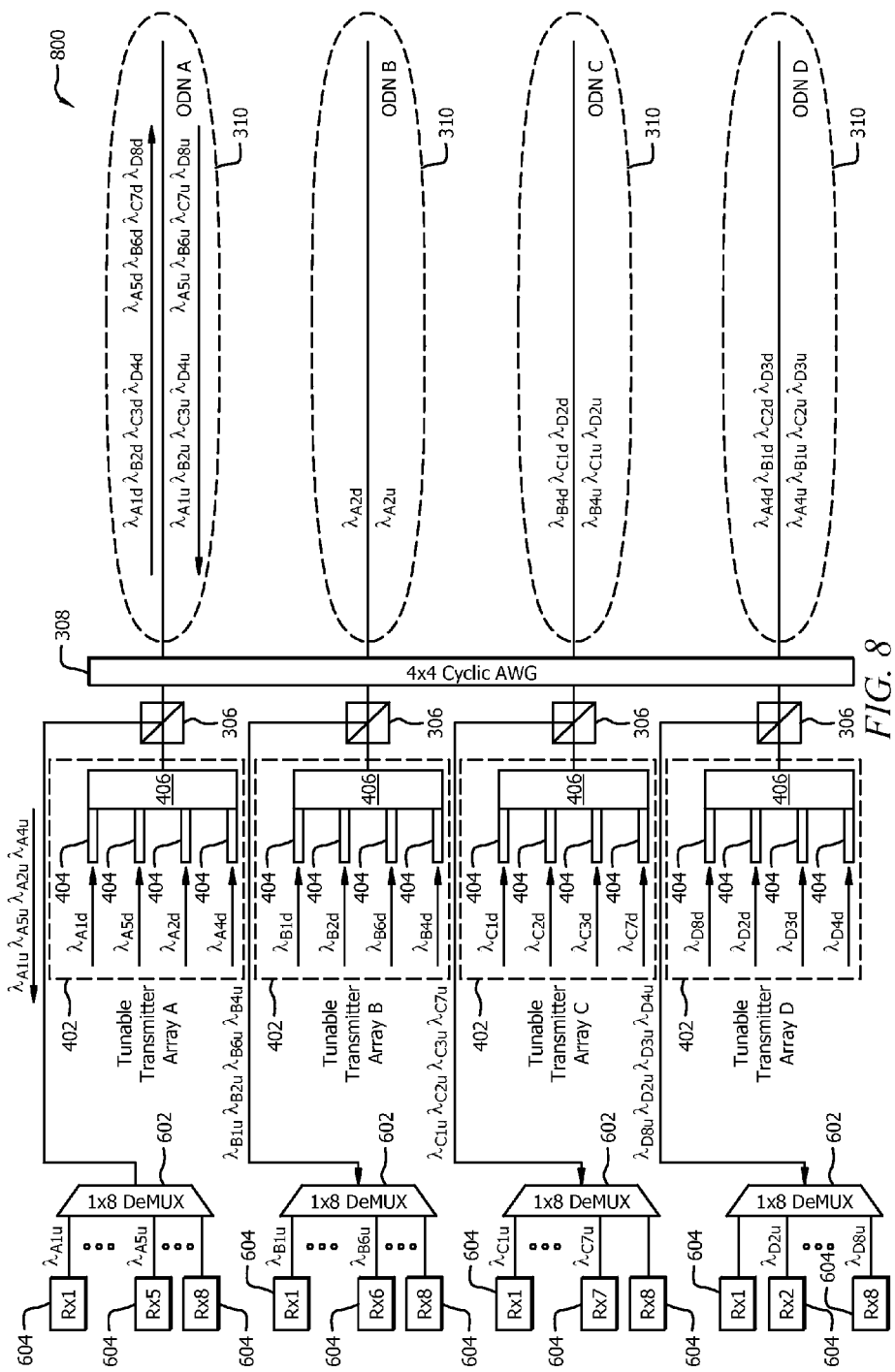
FIG. 8 is a schematic diagram of another embodiment of a reconfigurable PON sub-network with an eight wavelength tuning range and comprises a plurality of multiple channel receivers to receive upstream wavelengths from a plurality of ONUs.

FIG. 8 is a schematic diagram of another embodiment of a reconfigurable PON sub-network 800 with an eight wavelength tuning range and comprises a plurality of multiple channel receivers to receive upstream wavelengths from a plurality of ONUs. FIG. 8 illustrates an example case of receiving upstream transmission from the different ODNs A-D 310. In FIG. 8, the allocation of OLT resources (e.g. tunable transmitter arrays 402 and tunable transmitters 404) for downstream transmission may be substantially similar to FIG. 5. Specifically, the OLT has allocated eight downstream wavelengths to ODN A 310, one downstream wavelength to ODN B 310, three downstream wavelengths to ODN C 310, and four downstream wavelengths to ODN D 310. In order to match the downstream data rate, the number of upstream wavelength allocated to each ODN A-D 310 may be adjusted (e.g. increased or decreased) to match the number of downstream wavelengths allocated for downstream transmission.

Additionally, the downstream and upstream wavelengths may correspond to each other such that that both the downstream and upstream wavelengths traverse through the same ports of 4×4 cyclic AWG wavelength router 308. For example, in ODN A 310 the ONUs transmit upstream wavelengths $\lambda_{A1u}$, $\lambda_{B2u}$, $\lambda_{C3u}$, $\lambda_{D4u}$, $\lambda_{A5u}$, $\lambda_{B6u}$, $\lambda_{C7u}$, and $\lambda_{D8u}$, which correspond with the downstream wavelengths $\lambda_{A1d}$, $\lambda_{B2d}$, $\lambda_{C3d}$, $\lambda_{D4d}$, $\lambda_{A5d}$, $\lambda_{B6d}$, $\lambda_{C7d}$, and $\lambda_{D8d}$. In FIG. 8, the channel receivers 604 receive upstream wavelengths that correspond to the wavelengths that the tunable transmitter arrays A-D 402 provided in the downstream direction. Using FIG. 8 as an example, the 1×8 demultiplexer 602 that is coupled to the tunable transmitter array A 402 may receive wavelengths labeled $\lambda_{A1u}$, $\lambda_{A5u}$, $\lambda_{A2u}$, and $\lambda_{A4u}$, which correspond with $\lambda_{A1d}$, $\lambda_{A5d}$, $\lambda_{A2d}$, and $\lambda_{A4d}$, respectively; the 1×8 demultiplexer 602 that is coupled to the tunable transmitter array B 402 may receive wavelengths labeled $\lambda_{B1u}$, $\lambda_{2u}$, $\lambda_{B6u}$, and $\lambda_{B4u}$, which correspond with $\lambda_{B1d}$, $\lambda_{B2d}$, $\lambda_{B6d}$, and $\lambda_{B4d}$, respectively; the 1×8 demultiplexer 602 that is coupled to the tunable transmitter array C 402 may receive wavelengths labeled $\lambda_{C1u}$, $\lambda_{C2u}$, $\lambda_{C3u}$, and $\lambda_{C7u}$, which correspond with $\lambda_{C1d}$, $\lambda_{C2d}$, $\lambda_{C3d}$, and $\lambda_{C7d}$, respectively; and the 1×8 demultiplexer 602 that is coupled to the tunable transmitter array D 402 may receive wavelengths labeled $\lambda_{D8u}$, $\lambda_{D2u}$, $\lambda_{D3u}$, and $\lambda_{D4u}$, which correspond with $\lambda_{D8d}$, $\lambda_{D2d}$, $\lambda_{D3d}$, and $\lambda_{D4d}$, respectively. In comparison to FIG. 7, FIG. 8 illustrates another possible wavelength routing for upstream wavelengths.

Figure 9:
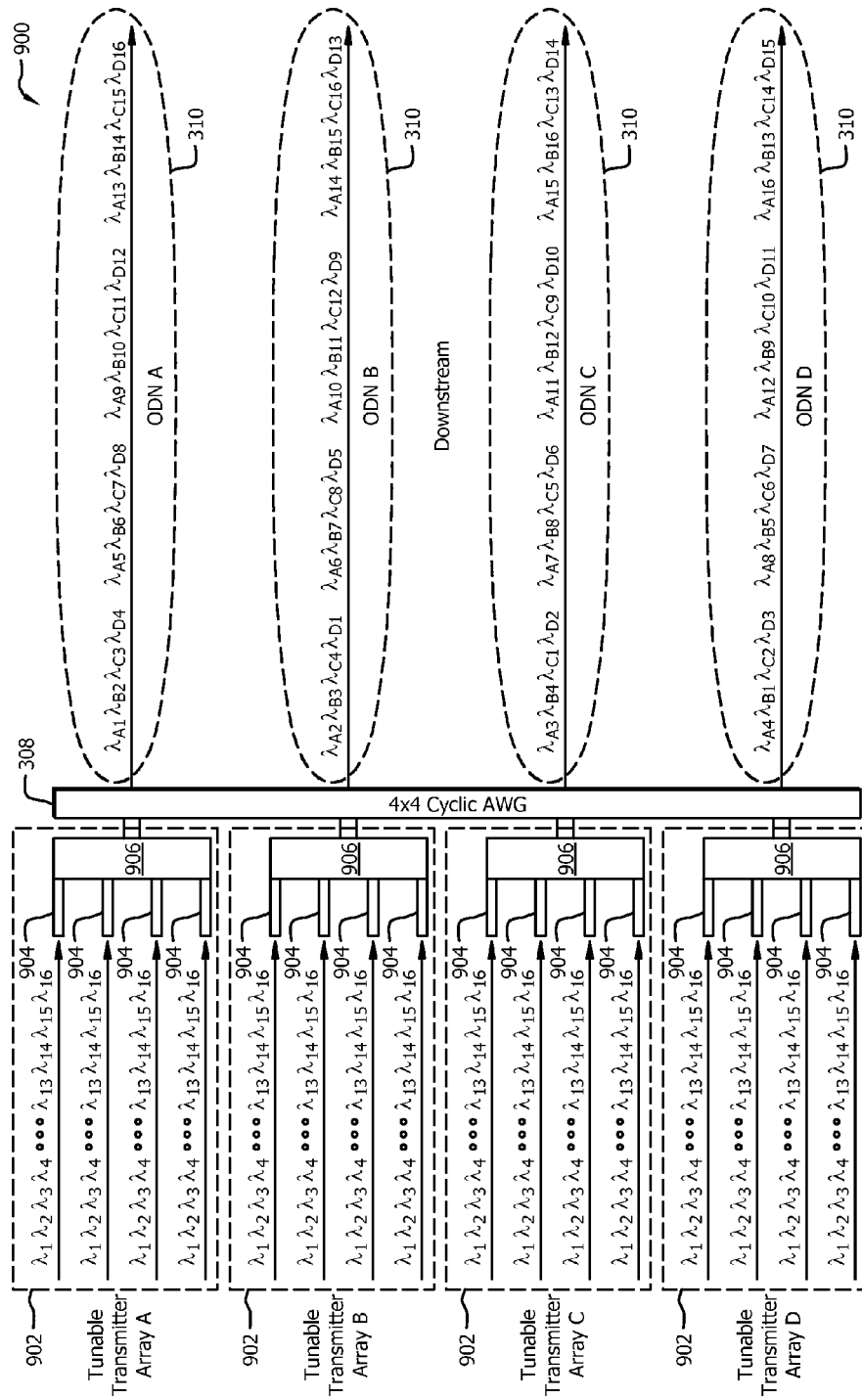
FIG. 9 is a schematic diagram of an embodiment of a reconfigurable PON sub-network with a 16 wavelength tuning range.

FIG. 9 is a schematic diagram of an embodiment of a reconfigurable PON sub-network 900 with a 16 wavelength tuning range. The reconfigurable PON sub-network 900 comprises a plurality of tunable transmitter arrays A-D 902, a 4×4 cyclic AWG wavelength router 308 and a plurality of ODNs A-D 310. Each of the tunable transmitter arrays A-D 902 comprises a plurality of tunable transmitters 904 that are configured to tune to 16 different wavelength bands, which are denoted as $\lambda_1$-$\lambda_{16}$. Within each tunable transmitter arrays A-D 902, the tunable transmitters 904 may be coupled to an optical coupler 906 (e.g. MMI or star coupler). Similar to the optical coupler 406 shown in FIG. 4, the optical coupler 906 combines the optical signals transmitted from each of the tunable transmitters 904 for a given tunable transmitter array 902 (e.g. tunable transmit array A 902) and outputs a combined optical signal that feeds into the 4×4 cyclic AWG wavelength router 308. The tunable transmitter arrays A-D 902, tunable transmitters 904, and optical coupler 906 will be discussed in more detail in FIG. 14. Although FIG. 9 illustrates four tunable transmitters 904 within each tunable transmitter array 902, in other embodiments, the number of tunable transmitters 904 may range from more than 4 to 8 tunable transmitters 904.

Similar to FIG. 4, FIG. 9 illustrates the wavelength output arrangement of the 4×4 cyclic AWG wavelength router 308 over the different ODNs A-D 310. For each output port, the 4×4 cyclic AWG wavelength router 308 assigns different tunable transmitter arrays A-D 902 to output the different wavelength bands $\lambda_1$-$\lambda_{16}$ over different ODNs A-D 310. In FIG. 9, the 16 different wavelength bands that may be output to ODN A 310 are labeled as $\lambda_{A1}$, $\lambda_{B2}$, $\lambda_{C3}$, $\lambda_{D4}$, $\lambda_{A5}$, $\lambda_{B6}$, $\lambda_{C7}$, $\lambda_{D8}$, $\lambda_{A9}$, $\lambda_{B10}$, $\lambda_{C11}$, $\lambda_{D12}$, $\lambda_{A13}$, $\lambda_{B14}$, $\lambda_{C15}$, and $\lambda_{D16}$. Label $\lambda_{A1}$ indicates that the 4×4 cyclic AWG wavelength router 308 has been configured such that wavelength band $\lambda_1$ is emitted from tunable transmitter array A 902; label $\lambda_{B2}$ indicates that the wavelength band $\lambda_2$ is emitted from tunable transmitter array B 902; label $\lambda_{C3}$ indicates that the wavelength band $\lambda_3$ is emitted from tunable transmitter array C 902; and label $\lambda_{D4}$ indicates that the wavelength band $\lambda_4$ is emitted from tunable transmitter array D 902. The labels $\lambda_{A5}$, $\lambda_{A9}$, and $\lambda_{13}$ indicate that the 4×4 cyclic AWG wavelength router 308 has been setup to repeat the tunable transmitter array 902 input order and assigns tunable transmitter array A 902 to emit wavelength bands $\lambda_5$, $\lambda_9$, and $\lambda_{13}$, respectively. The remaining wavelength bands $\lambda_{B6}$, $\lambda_{B10}$, and $\lambda_{B14}$, $\lambda_{C7}$ $\lambda_{C11}$, and $\lambda_{C14}$, and $\lambda_{D8}$, $\lambda_{D12}$, and $\lambda_{D16}$ may correspond to tunable transmitter array B 902, tunable transmitter array C 902, and tunable transmitter array D 902, respectively. Similar notation is used for the wavelength bands $\lambda_1$-$\lambda_{16}$ emitted on the other ODNs B-D 310.

Figure 10:
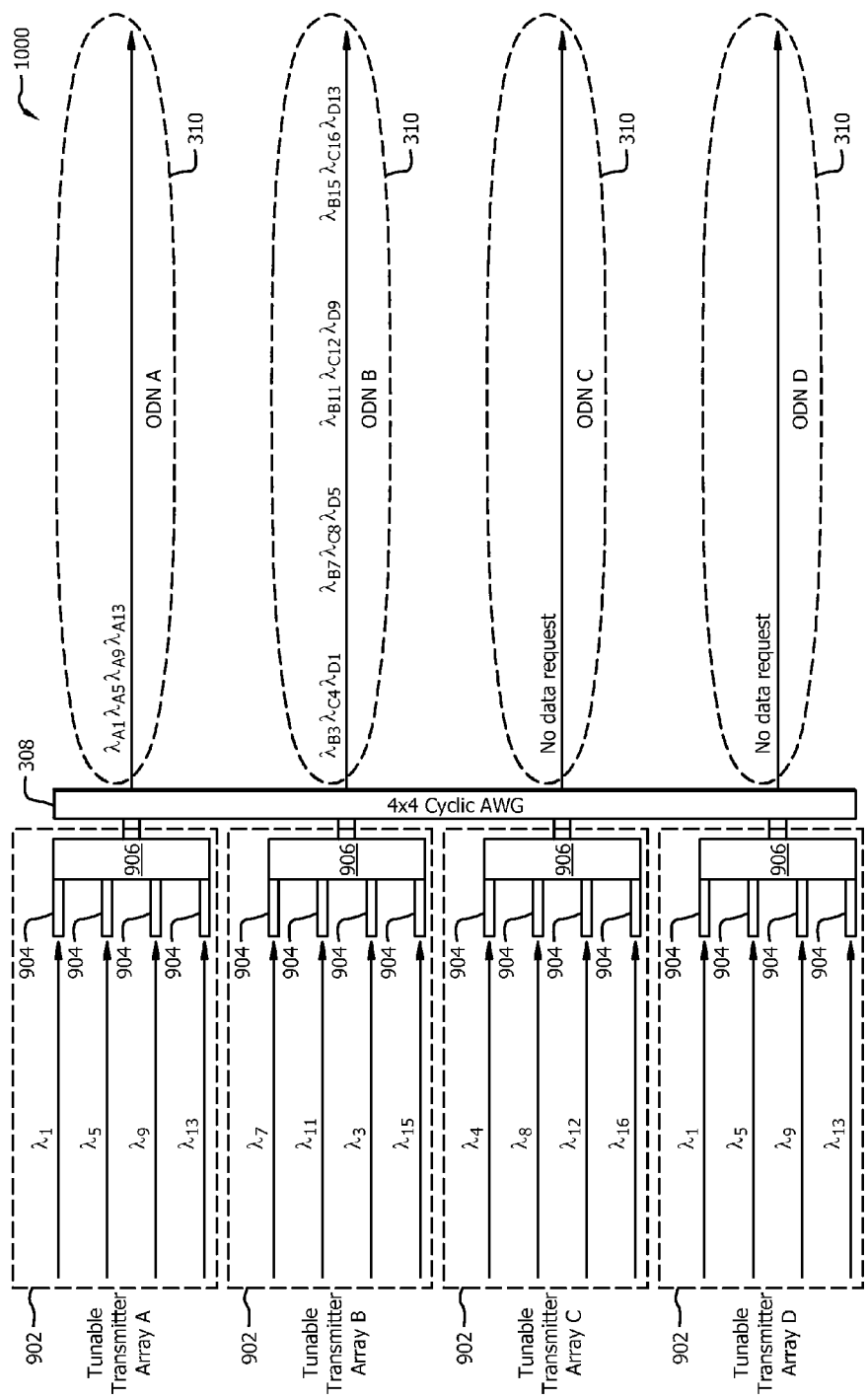
FIG. 10 is a schematic diagram of another embodiment of a reconfigurable PON sub-network with a 16 wavelength tuning range.

FIG. 10 is a schematic diagram of another embodiment of a reconfigurable PON sub-network 1000 with a 16 wavelength tuning range. Similar to FIG. 5, FIG. 10 illustrates a use case example of transmitting wavelengths over different ODNs A-D 310 using a total of 16 different tunable transmitters 904 that are configured to tune to 16 different wavelength bands $\lambda_1$-$\lambda_{16}$. In FIG. 10, each of the tunable transmitter arrays A-D 902 comprise four different tunable transmitters. The four tunable transmitters 904 within tunable transmitter array A 902 may be tuned to wavelength bands $\lambda_1$, $\lambda_5$, $\lambda_6$, and $\lambda_{13}$; the four tunable transmitters 904 within tunable transmitter array B 902 may be tuned to wavelength bands $\lambda_7$, $\lambda_{11}$, $\lambda_3$, and $\lambda_5$; the four tunable transmitters 904 within tunable transmitter array C 902 may be tuned to wavelength bands $\lambda_4$, $\lambda_8$, $\lambda_{12}$, and $\lambda_{16}$; and the four tunable transmitters 904 within tunable transmitter array D 902 may be tuned to wavelength bands $\lambda_1$, $\lambda_5$, $\lambda_9$, and $\lambda_{13}$.

The 16 different tunable transmitters 904 may access different ODNs A-D 310 by encoding data using different wavelength bands. In FIG. 10, no wavelengths are transmitted downstream over ODNs C and D 310 because the ONUs for the ODNs C and D 310 do not have any data request. Instead, wavelength resources have been moved to ODN A and B 310. Specifically, all four of the tunable transmitters 904 within the tunable transmitter array A 902 are used to transmit wavelengths $\lambda_{A1}$, $\lambda_{A5}$, $\lambda_{A6}$, and $\lambda_{A13}$ for ODN A 310. The 12 remaining tunable transmitters 904 in tunable transmitter arrays B-D 902 are tuned to wavelength bands that are allocated to ODN B 310. As shown in FIG. 10, wavelengths $\lambda_{B3}$, $\lambda_{C4}$, $\lambda_{D1}$, $\lambda_{B7}$, $\lambda_{C8}$, $\lambda_{D5}$, $\lambda_{B11}$, $\lambda_{C12}$, $\lambda_{D9}$, $\lambda_{B15}$, $\lambda_{C16}$, and $\lambda_{D13}$ are transmitted over ODN B 310. Recall, the OLT may dynamically allocate OLT resources depending on the network conditions and traffic loads over the ODNs A-D 310.

Figure 11:
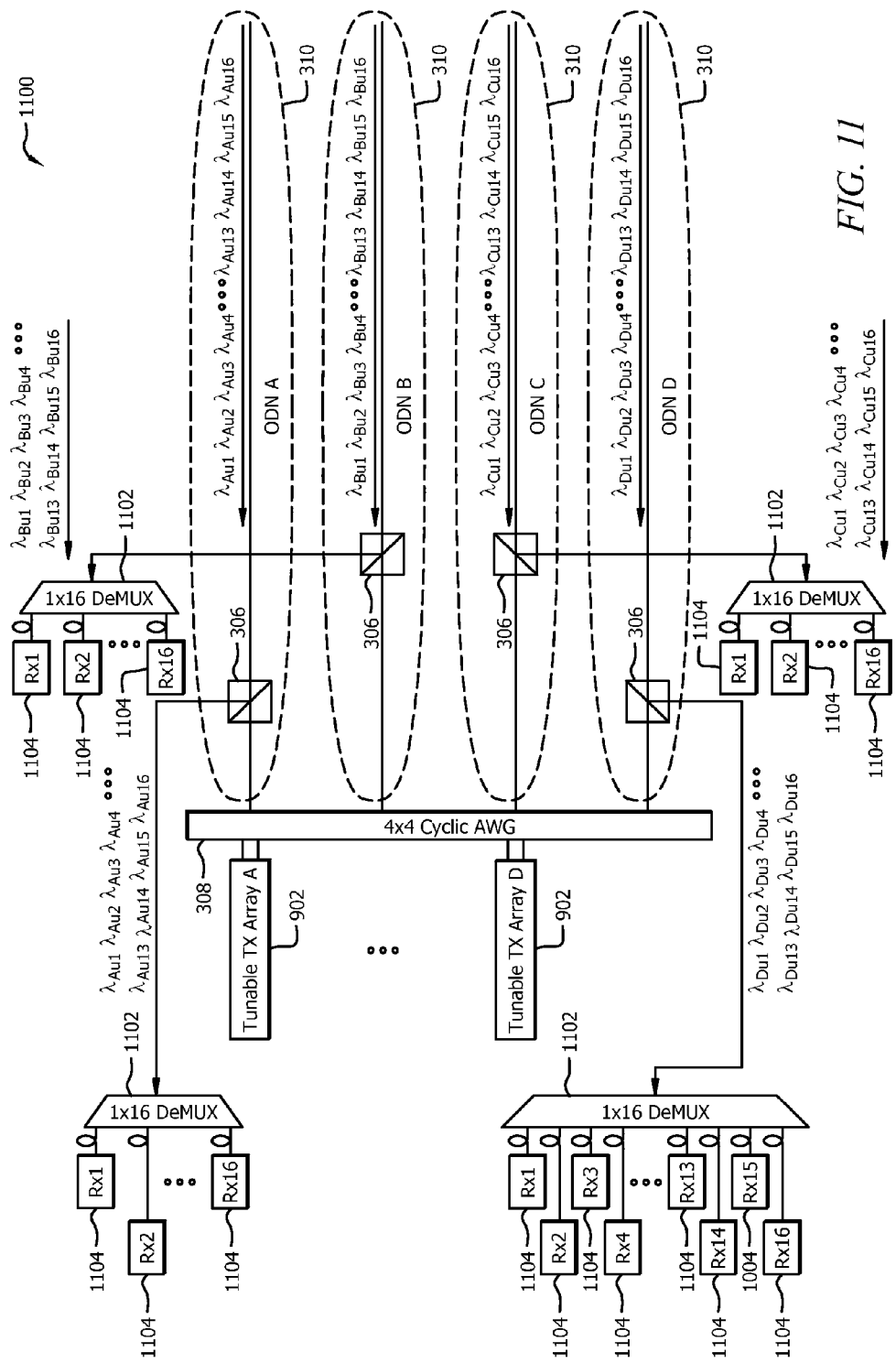
FIG. 11 is a schematic diagram of an embodiment of a reconfigurable PON sub-network with a 16 wavelength tuning range and comprises a plurality of multiple channel receivers to receive upstream wavelengths from a plurality of ONUs.

FIG. 11 is a schematic diagram of an embodiment of a reconfigurable PON sub-network 1100 with a 16 wavelength tuning range and comprises a plurality of multiple channel receivers to receive upstream wavelengths from a plurality of ONUs. The reconfigurable PON sub-network 1100 is substantially similar to the reconfigurable PON sub-network 600 in FIG. 6 except that each of the multiple channel receivers comprises sixteen channel receivers Rx1-Rx16 1104 and a 1×16 demultiplexer 1102. FIG. 11 illustrates that the reconfigurable PON sub-network 1100 may comprise a total of 64 channel receivers 1104 and four 1×16 demultiplexers. Each of the 1×16 demultiplexers 1102 may be an active or a passive demultiplexer that receives an upstream optical signal within one of the ODNs A-D 310 and separates out the different wavelength bands within the optical signal and sends the wavelength bands to the corresponding channel receivers 604. Each of the upstream wavelength bands received at the 1×16 demultiplexers 602 may be from tunable ONU transmitters associated with each of the ODNs A-D 310.

In FIG. 11, the multiple channel receiver that is coupled to ODN A 310 may receive an upstream optical signal that comprises wavelength bands $\lambda_{Au1}$, $\lambda_{Au2}$, $\lambda_{Au3}$, $\lambda_{Au4}$ . . . $\lambda_{Au13}$, $\lambda_{Au14}$, $\lambda_{Au15}$, and $\lambda_{Au16}$ transmitted from ONUs coupled to ODN A 310; the multiple channel receiver that is coupled to ODN B 310 may receive an upstream optical signal that comprises wavelength bands $\lambda_{Bu1}$, $\lambda_{Bu2}$, $\lambda_{Bu3}$, $\lambda_{Bu4}$ . . . . $\lambda_{Bu13}$, $\lambda_{Bu14}$, $\lambda_{Bu15}$, and $\lambda_{Bu16}$ transmitted from ONUs coupled to ODN B 310; the multiple channel receiver that is coupled to ODN C 310 may receive an upstream optical signal that comprises wavelength bands $\lambda_{Cu1}$, $\lambda_{Cu2}$, $\lambda_{Cu3}$, $\lambda_{Cu4}$ . . . $\lambda_{Cu13}$, $\lambda_{Cu14}$, $\lambda_{Cu15}$, and $\lambda_{Cu16}$ transmitted from ONUs coupled to ODN C 310; and the multiple channel receiver that is coupled ODN D 310 may receive an upstream optical signal that comprises wavelength bands $\lambda_{Du1}$, $\lambda_{Du2}$, $\lambda_{Du3}$, $\lambda_{Du4}$, . . . . $\lambda_{Du13}$, $\lambda_{Du14}$, $\lambda_{Du15}$, and $\lambda_{Du16}$ transmitted from ONUs coupled to ODN D 310. The different upstream wavelength bands for each ODN A-D 310 in FIG. 11 represents that any ONU or user may tune its upstream tunable transmitter to any one of the upstream wavelengths bands $\lambda_1$, $\lambda_2$, $\lambda_3$, $\lambda_4$, . . . $\lambda_{13}$, $\lambda_{14}$, $\lambda_{15}$, and $\lambda_{16}$. Similar embodiments of the reconfigurable PON sub-networks 700 and 800 may also be applied to receiving 16 different upstream wavelength bands.

In another embodiment, the optical filters 306 may be moved such that the optical filters 306 are positioned between the tunable transmitter array 902 and the 4×4 cyclic AWG wavelength router 308. Similar to FIG. 7, in this instance, the upstream optical signal received by the 1×16 demultiplexer that corresponds to the tunable transmitter array A 902 may comprise upstream wavelengths $\lambda_{Au1}$, $\lambda_{Bu2}$, $\lambda_{Cu3}$, $\lambda_{Du4}$ . . . $\lambda_{Au13}$, $\lambda_{Bu14}$, $\lambda_{Cu15}$, and $\lambda_{Du16}$; the upstream optical signal received by the 1×16 demultiplexer that corresponds to the tunable transmitter array B 902 may comprise upstream wavelengths $\lambda_{Au2}$, $\lambda_{Bu3}$, $\lambda_{Du1}$ . . . $\lambda_{Au14}$, $\lambda_{Bu15}$, $\lambda_{Bu16}$, and $\lambda_{Du13}$; the upstream optical signal received by the 1×16 demultiplexer that corresponds to the tunable transmitter array C 902 may comprise upstream wavelengths $\lambda_{Au3}$, $\lambda_{Bu4}$, $\lambda_{Cu1}$, $\lambda_{Du2}$, . . . $\lambda_{Au15}$, $\lambda_{Bu16}$, $\lambda_{Cu13}$, and $\lambda_{Du14}$; and the upstream optical signal received by the 1×16 demultiplexer that corresponds to the tunable transmitter array D 902 may comprise upstream wavelengths $\lambda_{Au4}$, $\lambda_{Bu1}$, $\lambda_{Cu2}$, $\lambda_{Du3}$ . . . $\lambda_{Au16}$, $\lambda_{Bu13}$, $\lambda_{Cu14}$, and $\lambda_{Du15}$. If each of the tunable transmitter arrays A-D comprise eight different tunable transmitters, then the reconfigurable PON sub-network 1100 may comprise a total of 32 tunable transmitters and 64 channel receivers 1004, which may make the PON sub-network 1100 more flexible for ever-growth application.

Figure 12:
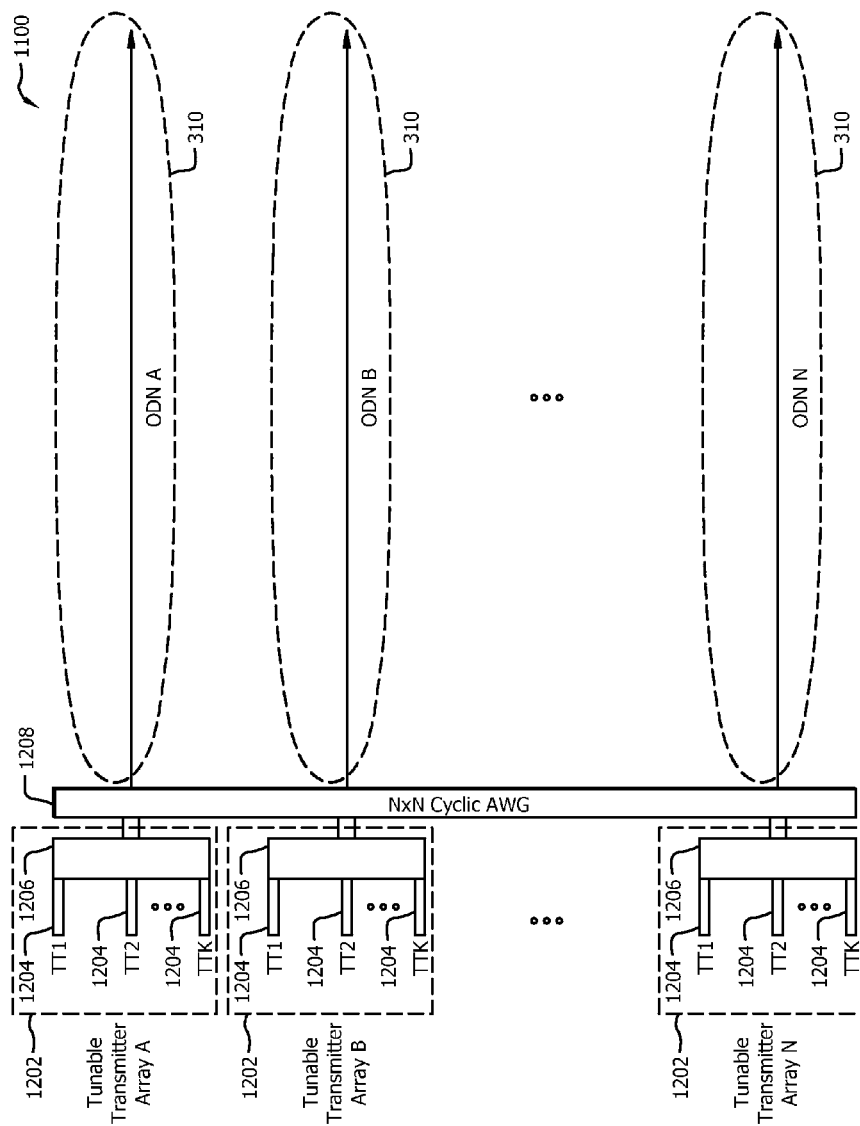
FIG. 12 is a schematic diagram of an embodiment of a generalized reconfigurable PON sub-network with a wavelength tuning range of N×N wavelengths in the downstream direction.

FIG. 12 is a schematic diagram of an embodiment of a generalized reconfigurable PON sub-network 1200 with a wavelength tuning range of N×N wavelengths in the downstream direction. FIG. 12 illustrates that the reconfigurable PON sub-network 1200 may comprise N tunable transmitter arrays 1202. Each of the transmitter arrays A-N 1202 comprises K different tunable transmitters 1204 (e.g. 8 tunable transmitters 1204). The K different tunable transmitters 1204 may be coupled to an optical coupler 1206 that combines the different wavelengths from the tunable transmitters 1204 to output a single optical signal that is fed into an N×N cyclic AWG wavelength router 1208. Each of the tunable transmitters 1204 may be configured with a tuning range that is equal to or less than N×N. The N×N cyclic AWG wavelength router 1208 may have N downstream inputs from the tunable transmitter arrays 1202 and N outputs for the N different ODNs 310. Similar to FIGS. 6 and 9, each of the tunable transmitters 1204 may access any of the ODNs A-N 310. By tuning the tunable transmitters 1204 from one wavelength to another, the generalized reconfigurable PON sub-network 1200 may allocate the tunable transmitters 1204 to other ODNs 310. By reallocating the tunable transmitters 1204, the OLT may dynamically increase or decrease one or more of the ODNs' 310 data rate.

Figure 13:
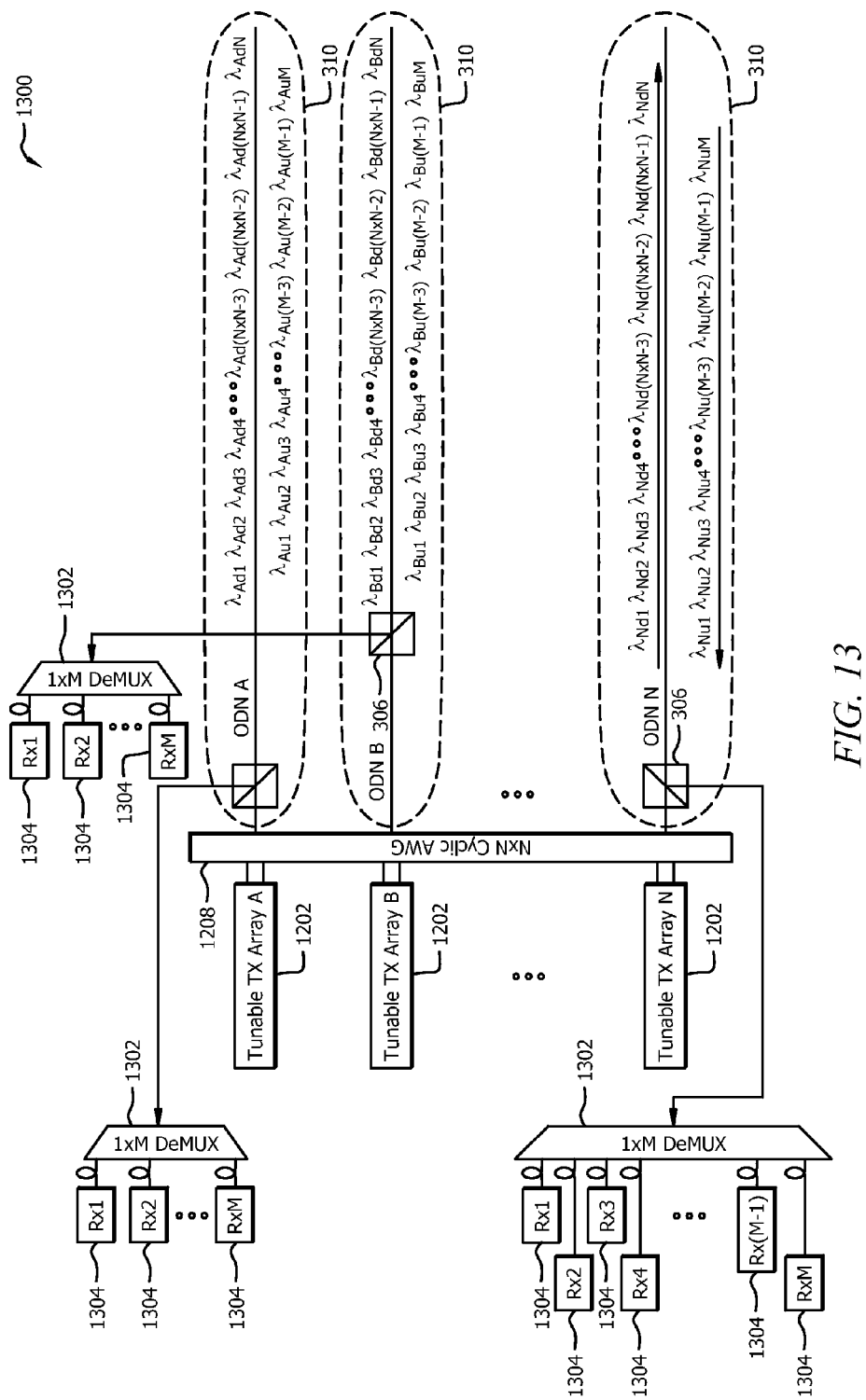
FIG. 13 is a schematic diagram of another embodiment of a generalized reconfigurable PON sub-network with a wavelength tuning range of N×N wavelengths in the downstream direction and upstream direction.

FIG. 13 is a schematic diagram of another embodiment of a generalized reconfigurable PON sub-network 1300 with a wavelength tuning range of N×N wavelengths in the downstream direction and upstream direction. PON sub-network 1300 may be substantially similar to PON sub-network 1200 except that the PON sub-network 1300 may further comprise a plurality of multiple channel receivers. Each of the multiple channel receivers may comprise a 1×M demultiplexer 1302 and M number of channel receivers 1304 and receive the upstream optical signals from the optical filters 306. Each of the 1×M demultiplexers 1302 may be an active or a passive demultiplexer that receives an upstream optical signal within one of the ODNs A-N 310 and separates out the different wavelength bands within the optical signal and sends the wavelength bands to the corresponding channel receivers 1304. Each of the upstream wavelength bands received at the 1×M demultiplexers 1302 may be from tunable ONU transmitters associated with each of the ODNs A-N 310. M represents the number of upstream wavelengths that the ONU transmitters are able to tune.

In FIG. 13, the multiple channel receiver that is coupled to ODN A 310 may receive an upstream optical signal that comprises wavelength bands $\lambda_{AU1}$, $\lambda_{AU2}$, $\lambda_{AU3}$, $\lambda_{AU4}$ . . . $\lambda_{AU(M-3)}$, $\lambda_{AU(M-2)}$, $\lambda_{AU(M-1)}$, and $\lambda_{AUM}$ transmitted from ONUs coupled to ODN A 310; the multiple channel receiver that is coupled to ODN B 310 may receive an upstream optical signal that comprises wavelength bands $\lambda_{BU1}$, $\lambda_{BU2}$, $\lambda_{BU3}$, $\lambda_{BU4}$ . . . $\lambda_{BU(M-3)}$, $\lambda_{BU(M-2)}$, $\lambda_{BU(M-1)}$, and $\lambda_{BUM}$ transmitted from ONUs coupled to ODN B 310; and the multiple channel receiver that is coupled to ODN N 310 may receive an upstream optical signal that comprises wavelength bands $\lambda_{NU1}$, $\lambda_{NU2}$, $\lambda_{NU3}$, $\lambda_{NU4}$ . . . $\lambda_{NU(M-3)}$, $\lambda_{NU(M-2)}$, $\lambda_{NU(M-1)}$, and $\lambda_{NUM}$ transmitted from ONUs coupled to ODN N 310. In the downstream direction, ODN A 310 may transport wavelengths $\lambda_{AD1}$, $\lambda_{AD2}$, $\lambda_{AD3}$, $\lambda_{AD4}$ . . . $\lambda_{AD(N \times N-3)}$, $\lambda_{AD(N \times N-2)}$, $\lambda_{AD(N \times N-1)}$, and $\lambda_{ADN \times N}$; ODN B 310 may transport wavelengths $\lambda_{BD1}$, $\lambda_{BD2}$, $\lambda_{BD3}$, $\lambda_{BD4}$ . . . $\lambda_{BD(N \times N-3)}$, $\lambda_{BD(N \times N-2)}$, $\lambda_{BD(N \times N-1)}$, and $\lambda_{BDN \times N}$; and ODN N 310 may transport wavelengths $\lambda_{ND1}$, $\lambda_{ND2}$, $\lambda_{ND3}$, $\lambda_{ND4}$ . . . $\lambda_{ND(N \times N-3)}$, $\lambda_{ND(N \times N-2)}$, $\lambda_{ND(N \times N-1)}$, and $\lambda_{NDN \times N}$. The tunable transmitters within each tunable transmit array A-N 1202 may be configured to encode data using N×N number of wavelengths.

Figure 14:
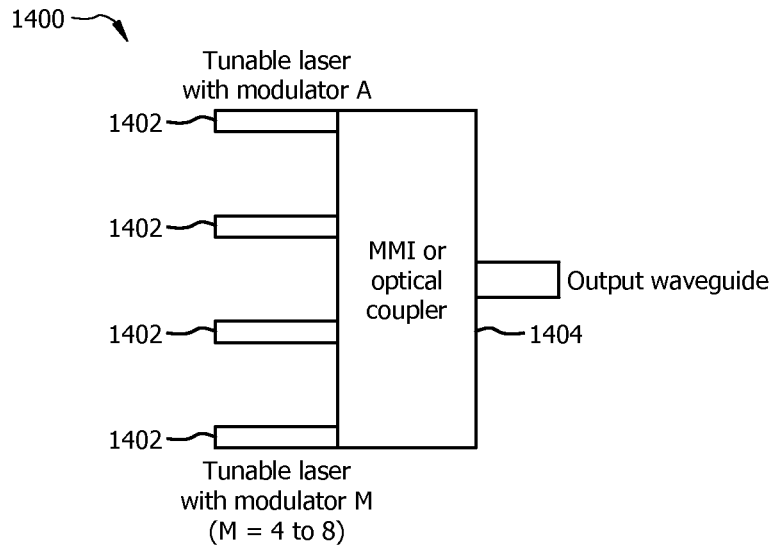
FIG. 14 is a schematic diagram of an embodiment of a tunable transmitter array.

FIG. 14 is a schematic diagram of an embodiment of a tunable transmitter array 1400. The tunable transmitter array 1400 that comprises a plurality of tunable laser with modulators A-M 1402, an optical coupler 1404. The tunable laser with modulator A-M 1402 may be configured to perform external modulation. In another embodiment, the tunable transmitter array 1400 may comprise tunable lasers without a modulator that is configured to perform direct modulation. The type of modulation implemented may depend on the downstream data rate. For example, if the data rate for a wavelength band is about 2.5 Gbs, the tunable transmitter may be a laser without a modulator that performs direct modulation. Alternatively, if the downstream transmission for a wavelength band is about 10 Gbs, the tunable laser with modulator 1402 may be configured to perform external modulation. If the tunable laser with modulator 1402 is configured to perform external modulation, then the external modulator may be monolithically integrated with the tunable laser, such as electroabsorption modulator or Mach-Zehnder modulator. In another embodiment, the external modulator may not be integrated and located on a separate device.

The optical coupler 1404 may be integrated or external to the tunable lasers with modulators 1402. The optical coupler 1404 may receive M different inputs from M different tunable lasers with modulators 1402 and output a combined optical signal based on the M different inputs into one fiber or waveguide. The combined optical signal may then sent to the one of the input ports of a cyclic AWG wavelength router. M may be represented as an integer and may represent the number of tunable transmitters within a tunable transmitter array 1400. As shown in FIGS. 4, 5, 9, and 10, M may have a value of about four. In other embodiments, the M value may be more than four (e.g. eight). In contrast to other optical combiners, such as a wavelength multiplexer, the optical coupler 1404 may be an optical device, such as an MMI or star coupler that are not wavelength sensitive. In other words, the optic coupler 1404 may not be configured as a wavelength transmission selection device and may combine all input wavelength light into the optical coupler's 1404 output port. The optical coupler 1404 may not filter any of the wavelengths or otherwise limit the wavelengths that pass through to the output port.

Figure 15:
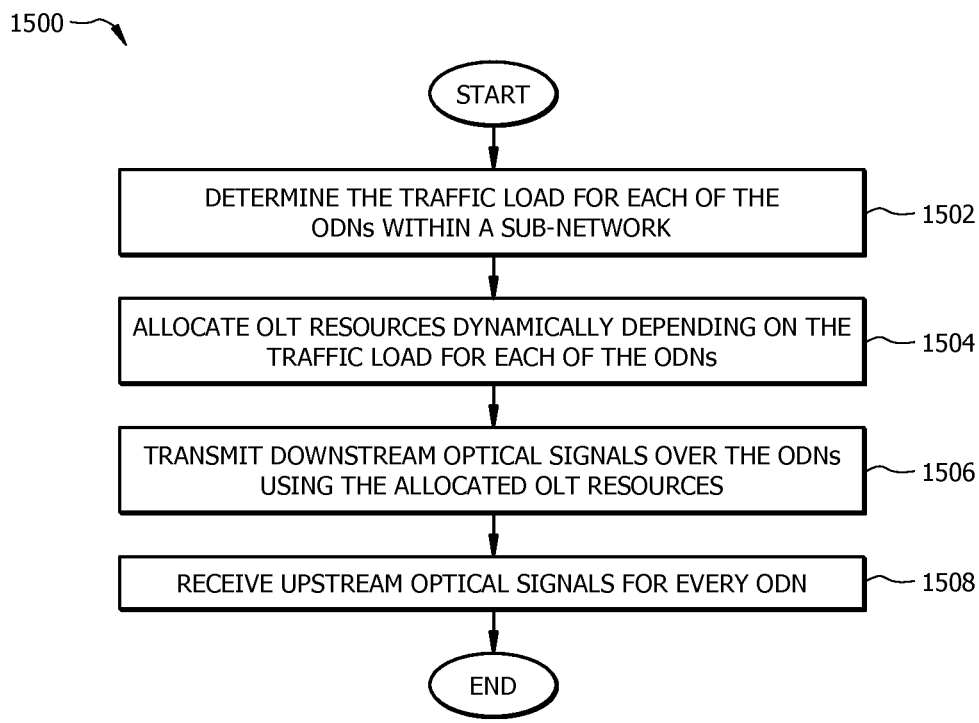
FIG. 15 is a flowchart of an embodiment of a method that dynamically allocates OLT resources over a plurality of ODNs.

FIG. 15 is a flowchart of an embodiment of a method 1500 that dynamically allocates OLT resources over a plurality of ODNs. Method 1500 may be implemented within an OLT or some other similar device within a PON network. Method 1500 may start at step 1502 and determine the traffic load for each of the ODNs within a sub-network. After determining the traffic load, method 1500 may move to step 1504 and allocate OLT resources dynamically depending on the traffic load for each of the ODNs. Recall that the OLT may tune the tunable transmitters within a tunable transmitter array to different wavelengths when allocating the OLT resources to the ODNs. Afterwards, method 1500 may move to step 1506 and transmit downstream optical signals over the ODNs using the allocated OLT resources. Method 1500 may proceed to step 1508 to receive upstream optical signals for every ODN. Method 1500 may implement step 1508 before, in parallel, and/or after steps 1502, 1504, and 1506. Method 1500 may implement step 1508 using point to point connections between channel receivers in the OLT and the ONUs. The point to point connections may be implemented simultaneously with point to multi-point connections.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
    a first tunable transmitter array comprising a first tunable transmitter and a second tunable transmitter;
    a cyclic array waveguide grating (AWG) wavelength router coupled to the first tunable transmitter array; and
    a first multiple channel receiver of a plurality of multiple channel receivers, wherein each of the plurality of multiple channel receivers comprise a plurality of channel receivers,
    wherein the first multiple channel receiver is configured to receive a combined upstream optical signal,
    wherein a number of receivers in the first multiple channel receiver is the same as a maximum number of upstream wavelengths transmitted by a plurality of optical distribution networks (ODNs),
    wherein the cyclic AWG wavelength router comprises a plurality of input ports and a plurality of output ports,
    wherein the cyclic AWG wavelength router is configured to:
        receive a first optical signal emitted from the first tunable transmitter via a first input port of the plurality of input ports;

receive a second optical signal emitted from the second tunable transmitter via a second input port of the plurality of input ports; and route the first optical signal and the second optical signal to the plurality of output ports dependent on one or more wavelengths used to encode the first optical signal and the second optical signal, and wherein the plurality of output ports are coupled to the plurality of ODNs.

2. The OLT of claim 1, wherein the cyclic AWG wavelength router is further configured to route a plurality of optical signals emitted from the first tunable transmitter to any of the output ports coupled to the plurality of ODNs based upon the wavelengths of the optical signals.

3. The OLT of claim 2, wherein the cyclic AWG wavelength router further configured to route the plurality of optical signals to one of the output ports that is coupled to a single ODN.

4. The OLT of claim 1, wherein the first tunable transmitter array further comprises an optical coupler and a tunable laser with a modulator, and wherein the optical coupler is configured to combine at least the first optical signal and the second optical signal into a waveguide to form a combined optical signal.

5. The OLT of claim 4, wherein the optical coupler is further configured to not be wavelength sensitive, and wherein the modulator is an external modulator integrated with the tunable laser.

6. The OLT of claim 4, wherein the optical coupler is a multi-mode interference coupler or a star optical coupler, and wherein the modulator is an Electroabsorption or a Mach-Zehnder modulator.

7. The OLT of claim 1, wherein the first tunable transmitter is tuned to encode data using a different wavelength than the first optical signal to form a third optical signal, and wherein the cyclic AWG wavelength router is further configured to route the third optical signal to a different output port than the output port allocated for the first optical signal.

8. The OLT of claim 1, further comprising an optical filter coupled between the cyclic AWG wavelength router and the first tunable transmitter array.

9. The OLT of claim 1, further comprising an optical filter located within one of the plurality of ODNs and coupled to the cyclic AWG wavelength router.

10. The OLT of claim 1, wherein the first multiple channel receiver comprises a plurality of channel receivers used to form one or more point to point connections with one or more optical network units coupled to one or more ODNs.

11. The OLT of claim 1, wherein the first multiple channel receiver is one of a plurality of multiple channel receivers.

12. A method for allocating optical line terminal (OLT) resources at an OLT comprising a first set of transmitters and a set of multiple channel receivers, the method comprising:

transmitting a first optical signal over a first optical distribution network (ODN) to a first set of optical network units (ONUs) using a first transmitter within the first set of transmitters;

transmitting a second optical signal over a second ODN to a second set of optical network units (ONUs) using a second transmitter within the first set of transmitters;

combining the first optical signal with the second optical signal without being wavelength specific;

retuning the first transmitter within the first set of transmitters to emit a third optical signal at a different wavelength from the first optical signal;

transmitting the third optical signal over the first ODN, the second ODN, or another ODN based upon the different wavelength;

receiving a plurality of upstream optical signals from the first set of ONUs; and establishing a plurality of point to point connections using the set of multiple channel receivers, wherein the plurality of point to point connections allow the set of multiple channel receivers to receive the plurality of upstream optical signals from the first set of ONUs, wherein the number of receivers in the set of multiple channel receivers is the same as a maximum number of upstream wavelengths transmitted by the first set of ONUs.

13. The method of claim 12, further comprising determining traffic loads for the first ODN, the second ODN, or the another ODN, wherein retuning the first transmitter is based upon the determination of the traffic loads for the first ODN, the second ODN, or the another ODN.

14. The method of claim 13, further comprising putting a second set of transmitters within the OLT to sleep based upon the determination of the traffic loads for at least the first ODN, the second ODN, or the another ODN.

15. A passive optical network (PON) system comprising:

an optical line terminal (OLT) comprising a plurality of tunable transmitter arrays;

a plurality of optical distribution networks (ODNs) coupled to the OLT;

a plurality of optical network units (ONUs) coupled to the plurality of ODNs, wherein the OLT further comprises a plurality of multiple channel receivers, wherein each of the multiple channel receivers comprises a plurality of channel receivers, and wherein a number of the plurality of channel receivers within one of the multiple channel receivers is the same as a maximum number of upstream wavelengths transmitted by the plurality of ODNs; and an arrayed waveguide grating (AWG) wavelength router coupled to the OLT and the plurality of ODNs such that the AWG wavelength router is positioned between the OLT and the plurality of ODNs, wherein the AWG wavelength router configured to:

receive a combined optical signal from one of the tunable transmitter arrays, wherein the combined optical signal comprises a plurality of encoded wavelengths; and distribute the encoded wavelengths to the plurality of ODNs according to a plurality of wavelength bands the encoded wavelengths fall within.

16. The system of claim 15, wherein each of the tunable transmitter arrays comprise an optical coupler that is not wavelength specific, and wherein the combined optical signal is not wavelength sensitive and comprises a plurality of input wavelengths from a plurality of tunable transmitters within each of the tunable transmitter arrays.

17. The system of claim 15, wherein the channel receivers receive the upstream wavelengths after the AWG wavelength router processes the upstream wavelengths.

* * * * *

UNITED STATES PATENT AND TRADEMARK OFFICE
CERTIFICATE OF CORRECTION

PATENT NO. : 9,560,428 B2
APPLICATION NO. : 14/280191
DATED : January 31, 2017
INVENTOR(S) : Xuejin Yan Page 1 of 4

It is certified that error appears in the above-identified patent and that said Letters Patent is hereby corrected as shown below:

On the Title Page

Delete page 2 and substitute therefore the attached page 2 showing the corrected number of claims.

In the Claims

Column 20, Line 46 - Column 22, Line 61, delete Claims 1-17 and insert the following Claims 1-16.

--1. An optical line terminal (OLT) comprising:
    a first tunable transmitter array comprising a first tunable transmitter and a second tunable transmitter;
    a cyclic array waveguide grating (AWG) wavelength router coupled to the first tunable transmitter array; and
    a first multiple channel receiver of a plurality of multiple channel receivers, wherein each of the plurality of multiple channel receivers comprise a plurality of channel receivers,
    wherein the first multiple channel receiver is configured to receive a combined upstream optical signal,
    wherein a number of receivers in the first multiple channel receiver is the same as a maximum number of upstream wavelengths transmitted by a plurality of optical distribution networks (ODNs),
    wherein the cyclic AWG wavelength router comprises a plurality of input ports and a plurality of output ports,
    wherein the cyclic AWG wavelength router is configured to:
        receive a first optical signal emitted from the first tunable transmitter via a first input port of the plurality of input ports;
        receive a second optical signal emitted from the second tunable transmitter via a second input port of the plurality of input ports; and Signed and Sealed this
Twenty-seventh Day of March, 2018

Andrei Iancu
*Director of the United States Patent and Trademark Office* route the first optical signal and the second optical signal to the plurality of output ports dependent on one or more wavelengths used to encode the first optical signal and the second optical signal, and
wherein the plurality of output ports are coupled to the plurality of ODNs.

2. The OLT of claim 1, wherein the cyclic AWG wavelength router is further configured to route a plurality of optical signals emitted from the first tunable transmitter to any of the output ports coupled to the plurality of ODNs based upon the wavelengths of the optical signals.

3. The OLT of claim 2, wherein the cyclic AWG wavelength router is further configured to route the plurality of optical signals to one of the output ports that is coupled to a single ODN.

4. The OLT of claim 1, wherein the first tunable transmitter array further comprises an optical coupler and a tunable laser with a modulator, and wherein the optical coupler is configured to combine at least the first optical signal and the second optical signal into a waveguide to form a combined optical signal.

5. The OLT of claim 4, wherein the optical coupler is further configured to not be wavelength sensitive, and wherein the modulator is an external modulator integrated with the tunable laser.

6. The OLT of claim 4, wherein the optical coupler is a multi-mode interference coupler or a star optical coupler, and wherein the modulator is an Electroabsorption or a Mach-Zehnder modulator.

7. The OLT of claim 1, wherein the first tunable transmitter is tuned to encode data using a different wavelength than the first optical signal to form a third optical signal, and wherein the cyclic AWG wavelength router is further configured to route the third optical signal to a different output port than the output port allocated for the first optical signal.

8. The OLT of claim 1, further comprising an optical filter coupled between the cyclic AWG wavelength router and the first tunable transmitter array.

9. The OLT of claim 1, further comprising an optical filter located within one of the plurality of ODNs and coupled to the cyclic AWG wavelength router.

10. The OLT of claim 1, wherein the first multiple channel receiver comprises a plurality of channel receivers used to form one or more point to point connections with one or more optical network units coupled to one or more ODNs.

11. A method for allocating optical line terminal (OLT) resources at an OLT comprising a first set of transmitters and a set of multiple channel receivers, the method comprising:
    transmitting a first optical signal over a first optical distribution network (ODN) to a first set of optical network units (ONUs) using a first transmitter within the first set of transmitters;
    transmitting a second optical signal over a second ODN to a second set of optical network units (ONUs) using a second transmitter within the first set of transmitters;
    combining the first optical signal with the second optical signal without being wavelength specific;

retuning the first transmitter within the first set of transmitters to emit a third optical signal at a different wavelength from the first optical signal;

transmitting the third optical signal over the first ODN, the second ODN, or another ODN based upon the different wavelength;

receiving a plurality of upstream optical signals from the first set of ONUs; and establishing a plurality of point to point connections using the set of multiple channel receivers, wherein the plurality of point to point connections allow the set of multiple channel receivers to receive the plurality of upstream optical signals from the first set of ONUs, wherein the number of receivers in the set of multiple channel receivers is the same as a maximum number of upstream wavelengths transmitted by the first set of ONUs.

12. The method of claim 11, further comprising determining traffic loads for the first ODN, the second ODN, or the another ODN, wherein retuning the first transmitter is based upon the determination of the traffic loads for the first ODN, the second ODN, or the another ODN.

13. The method of claim 12, further comprising putting a second set of transmitters within the OLT to sleep based upon the determination of the traffic loads for at least the first ODN, the second ODN, or the another ODN.

14. A passive optical network (PON) system comprising:
an optical line terminal (OLT) comprising a plurality of tunable transmitter arrays;
a plurality of optical distribution networks (ODNs) coupled to the OLT;
a plurality of optical network units (ONUs) coupled to the plurality of ODNs, wherein the OLT further comprises a plurality of multiple channel receivers, wherein each of the multiple channel receivers comprises a plurality of channel receivers, and wherein a number of the plurality of channel receivers within one of the multiple channel receivers is the same as a maximum number of upstream wavelengths transmitted by the plurality of ODNs; and
an arrayed waveguide grating (AWG) wavelength router coupled to the OLT and the plurality of ODNs such that the AWG wavelength router is positioned between the OLT and the plurality of ODNs,
wherein the AWG wavelength router is configured to:
receive a combined optical signal from one of the tunable transmitter arrays, wherein the combined optical signal comprises a plurality of encoded wavelengths; and
distribute the encoded wavelengths to the plurality of ODNs according to a plurality of wavelength bands the encoded wavelengths fall within.

15. The system of claim 14, wherein each of the tunable transmitter arrays comprise an optical coupler that is not wavelength specific, and wherein the combined optical signal is not wavelength sensitive and comprises a plurality of input wavelengths from a plurality of tunable transmitters within each of the tunable transmitter arrays.

16. The system of claim 14, wherein the channel receivers receive the upstream wavelengths after the AWG wavelength router processes the upstream wavelengths.-- optical signal to the output ports dependent on one or more wavelengths used to encode the first optical signal and the second optical signal.

16 Claims, 14 Drawing Sheets

(52) U.S. Cl.
CPC ...... *H04J 14/0265* (2013.01); *H04J 14/0282* (2013.01); *H04J 14/0247* (2013.01); *H04J 14/0252* (2013.01); *H04Q 2011/0018* (2013.01); *H04Q 2011/0022* (2013.01)

(58) Field of Classification Search
USPC .............. 398/49, 61, 66–72, 79, 82, 91, 95, 90, 398/165, 167.5
See application file for complete search history.

(56) References Cited

U.S. PATENT DOCUMENTS

| | | | |
|---|---|---|---|
| 8,995,484 B2* | 3/2015 | Ho | H01S 3/04 372/34 |
| 9,397,778 B2* | 7/2016 | Lee | H04J 14/023 |
| 9,436,021 B2* | 9/2016 | Ye | G02F 1/0147 |
| 2006/0140631 A1* | 6/2006 | Brolin | H04J 14/0226 398/79 |
| 2009/0202245 A1* | 8/2009 | Bouda | H04J 14/0226 398/76 |
| 2010/0142955 A1* | 6/2010 | Yu | H04B 10/25754 398/72 |
| 2011/0236017 A1* | 9/2011 | Ohlen | H04J 14/0282 398/34 |
| 2011/0293279 A1* | 12/2011 | Lam | H04J 14/0279 398/79 |
| 2013/0089319 A1* | 4/2013 | Grobe | H04J 14/0227 398/7 |
| 2013/0183039 A1* | 7/2013 | Hood | H04J 14/0234 398/72 |
| 2014/0341579 A1* | 11/2014 | Effenberger | H04J 14/0221 398/68 |

OTHER PUBLICATIONS

International Telecommunication Union, Telecommunication Standardization Sector, Study Group 15, Question 2/15, W/P 1/15, "Draft new Recommendation ITU-T G.multi," Nov. 7, 2013, 21 pages.

Kani, J., "Enabling Technologies for Future Scalable and Flexible WDM-PON and WDM/TDM-PON Systems," IEEE Journal of Selected Topics in Quantum Electronics, vol. 16, No. 5, Sep./Oct. 2010, pp. 1290-1297.

Bock, C., et al., "Hybrid WDM/TDM PON Using the AWG FSR and Featuring Centralized Light Generation and Dynamic Bandwidth Allocation," IEEE, Journal of Lightwave Technology, vol. 23, No. 12, Dec. 2005, pp. 3981-3987.

Hsueh, Y., et al., "A Highly Flexible and Efficient Passive Optical Network Employing Dynamic Wavelength Allocation," IEEE, Journal of Lightwave Technology, vol. 23, No. 1, Jan. 2005, pp. 277-286.

Nakamura, H., "λ-tunable WDM/TDM-PON Using DWBA towards Flexible Next-Generation Optical Access Networks," Progress In Electromagnetics Research Symposium Proceedings, KL, Malaysia, Mar. 27-30, 2012, pp. 507-510.

Kimura, S., "WDM/TDM-PON Technologies for Future Flexible Optical Access Networks," 15th OptoElectronics and Communications Conference (OECC2010) Technical Digest, Sapporo Convention Center, Japan, Jul. 2010, pp. 14-15.

Pal, B., et al., "Statistical Method for ROADM Cascade Penalty," IEEE, OSA/OFC/NFOEC, 2010, 3 pages.

Draft New Recommendation, ITU-T G.989.2, 40-Gigabit-Capable Passive Optical Networks 2 (NG-PON2): Physical Media Dependent (PDM) Layer Specification, Feb. 14, 2014, 94 pages.

Gagnaire, M., et al., "A new Control Plane for Next-Generation WDM-PON Access System," Second International Conference on Access Networks & Workshops, Aug. 1, 2007, 8 pages.

Shachaf, Y., et al., "A Full-duplex Access Network based on CWDM-routed PONs," Conference on Optical Fiber Communication/National Fiber Optic Engineers Conference, Feb. 24, 2008, 3 pages.

Nakamura, H., et al., "40Gbit/s-class-λ-tunable WDM/TDM-PON using Tunable B-Tx and Cyclic AWG Router for Flexible Photonic Aggregation Networks," 38th European Conference and Exhibition on Optical Communications, Sep. 16, 2012, 3 pages.

Foreign Communication From A Counterpart Application, PCT Application No. PCT/US2014/038480, International Search Report dated Sep. 24, 2014, 4 pages.

Foreign Communication From A Counterpart Application, PCT Application No. PCT/US2014/038480, Written Opinion dated Sep. 24, 2014, 7 pages.

Foreign Communication From a Counterpart Application, European Application No. 14731478.5, European Office Action dated Nov. 21, 2016, 5 pages.

* cited by examiner